United States Patent [19]

Ise et al.

[11] Patent Number: 4,687,021

[45] Date of Patent: Aug. 18, 1987

[54] VACUUM VALVE-SENSOR DEVICE

[75] Inventors: Yoji Ise; Teruo Kanno; Akira Yamaguchi, all of Tokyo, Japan

[73] Assignee: Myotoku Ltd., Tokyo, Japan

[21] Appl. No.: 787,905

[22] Filed: Oct. 16, 1985

[30] Foreign Application Priority Data

Oct. 29, 1984 [JP] Japan .................. 59-225893

[51] Int. Cl.⁴ .................. F16K 27/00; F16K 15/02
[52] U.S. Cl. .................. 137/526; 137/557; 137/884; 137/536; 417/44; 417/187
[58] Field of Search ........... 137/526, 536, 557, 884; 417/44, 187, 189

[56] References Cited

U.S. PATENT DOCUMENTS

| | | | |
|---|---|---|---|
| 2,047,654 | 7/1936 | Te Pas | 137/536 X |
| 2,682,886 | 7/1954 | Paxton | 417/187 X |
| 3,435,841 | 4/1969 | Williams et al. | 137/205 X |
| 3,599,639 | 8/1971 | Spotz | 137/205 X |
| 4,432,701 | 2/1984 | Ise | 417/187 |
| 4,549,854 | 10/1985 | Yamamoto | 417/187 |

Primary Examiner—Arnold Rosenthal
Attorney, Agent, or Firm—Robert E. Burns; Emmanuel J. Lobato

[57] ABSTRACT

A vacuum valve-sensor device mounted on a vacuum source and maintaining the vacuum generated by the vacuum source to a required level. It includes a one-way valve which allows gas to flow towards the vacuum source but not away therefrom, and a pressure sensor on the side of the one-way valve remote from the vacuum source. The one-way valve includes a valve seat through which flow of gas is directed and a valve element biased toward seating on the valve seat from the side of the vacuum source. The pressure sensor may be located on the side of the valve seat remote from the valve element thereof, and may include a V-ring seal member fitted on the valve element.

4 Claims, 20 Drawing Figures

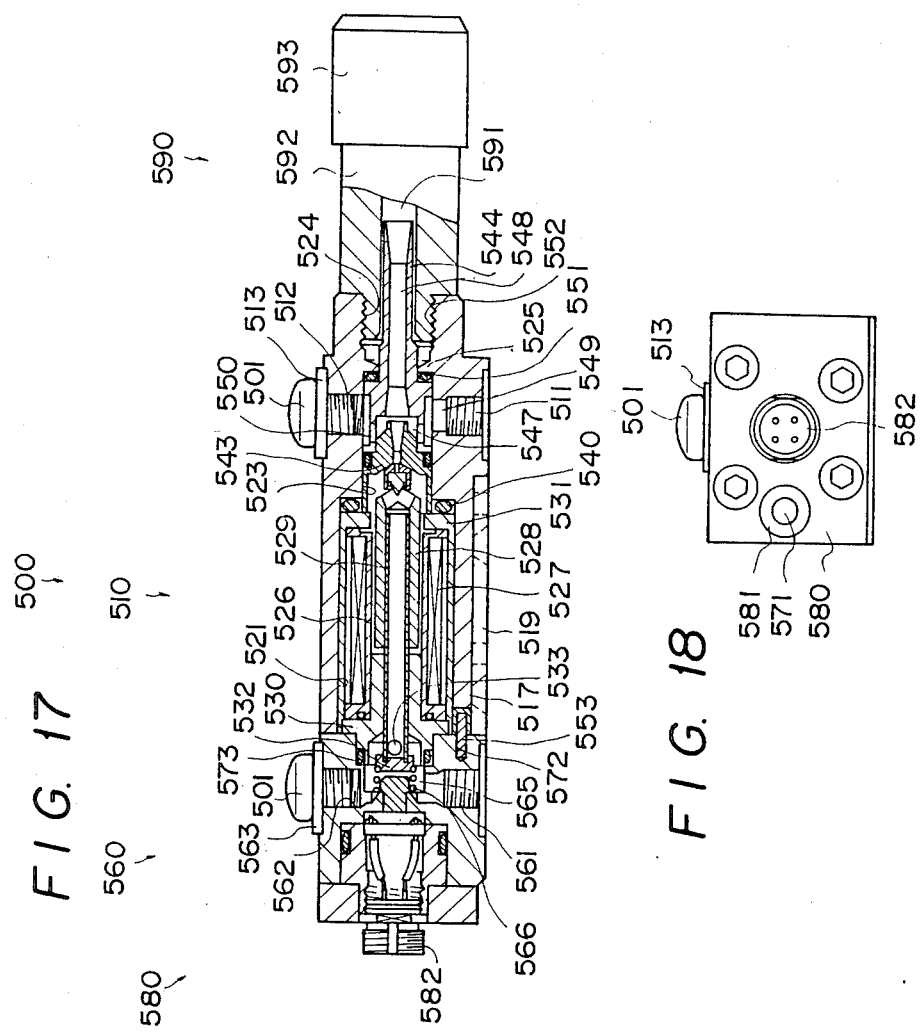

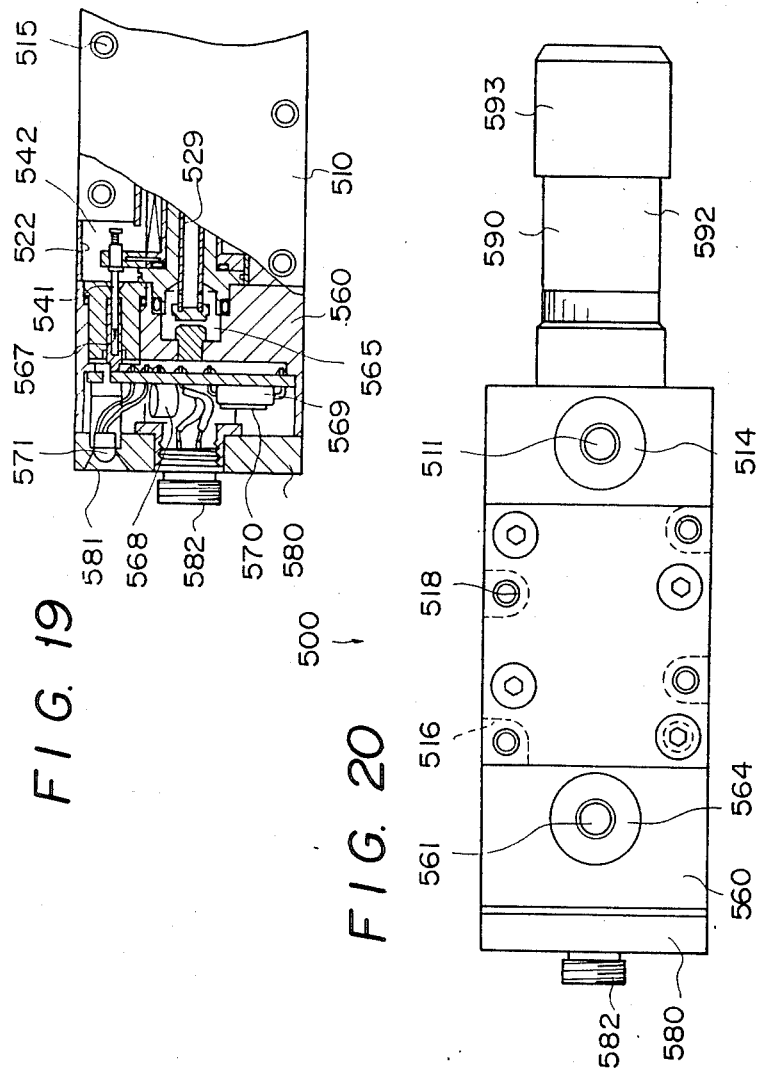

VACUUM VALVE-SENSOR DEVICE

BACKGROUND OF THE INVENTION

The present invention relates to a vacuum valve/sensor device, and more particularly relates to a vacuum valve/sensor device provided in a vacuum regulating apparatus which not only can measure the amount of vacuum, i.e. the amount of negative pressure, but also houses a one way valve which makes it possible to maintain a vacuum condition even when the vacuum generating apparatus is not being continually operated.

In the following specification of the present invention, and in the claims, the term "vacuum" will be used as meaning and including air at a pressure substantially depressed below ambient atmospheric pressure, for the convenience of description.

In prior art vacuum regulating devices, pressure sensors for measuring the vacuum value produced have been known to be incorporated, and thus measuring of whether the necessary degree of vacuum is being produced or not has been possible. Further, in prior art vacuum regulating devices, it is per se known to provide a vacuum preserving device, i.e. a one way valve for reducing the consumption of vacuum and holding said vacuum at a high level.

However, in such prior arts, because such a pressure sensor and such a one way valve have been provided as separate elements, the conduit arrangement between the vacuum regulating device and the vacuum generating apparatus, or alternatively between the vacuum regulating device and the apparatus utilizing the vacuum (such as a suction pad for lifting objects) has been required to be complicated.

Also, sometimes the vacuum condition or level maintained by the one way valve drops with the passage of time, due to leakage of air from such a vacuum utlizing apparatus or from some point in the conduit arrangment leading thereto. In such a case when such drop of vacuum level occurs, it must immediately be detected by the pressure sensor, in order for the vacuum generating apparatus to be again put into operation; since, if the proper level of vacuum is not maintained, the apparatus receiving the vacuum may malfunction—in the case of such apparatus being a lifting suction pad, an article or workpiece being lifted by the suction pad may be dropped.

SUMMARY OF THE INVENTION

Accordingly, it is the primary object of the present invention to provide a vacuum valve-sensor device which overcomes the above outlined problems.

It is a further object of the present invention to provide such a vacuum valve-sensor device which can be linked with a vacuum generating apparatus and with a vacuum utilizing apparatus by a simple conduit arrangement.

It is a further object of the present invention to provide such a vacuum valve-sensor device which both can maintain a vacuum to a required level by the use of a one way valve and a vacuum sensor, and can monitor said maintained vacuum level.

It is a further object of the present invention to provide such a vacuum valve-sensor device which can provide a quick response to drop of the maintained vacuum level.

It is a yet further object of the present invention to provide such a vacuum valve-sensor device which is both cheap and reliable.

According to the most general aspect of the present invention, these and other objects are accomplished by a vacuum valve-sensor device, for being mounted to a vacuum source, comprising: a one way valve which allows gas to flow towards said vacuum source but not away therefrom; and a pressure sensor on the side of said one way valve remote from said vacuum source.

BRIEF DESCRIPTION OF THE DRAWINGS

The present invention will now be shown and described with reference to the preferred embodiment thereof, and with reference to the illustrative drawings in which:

FIG. 17 is a vertical sectional view of the vacuum generating apparatus included in said vacuum regulating apparatus shown in FIG. 5;

FIG. 18 is a side elevational view of the vacuum generating apparatus shown in FIG. 17;

FIG. 19 is a partially cut away plan view of the vacuum generating apparatus shown in FIG. 17; and FIG. 20 is an underneath view of the vacuum generating apparatus shown in FIG. 17.

DESCRIPTION OF THE PREFERRED EMBODIMENT

Figure 5:
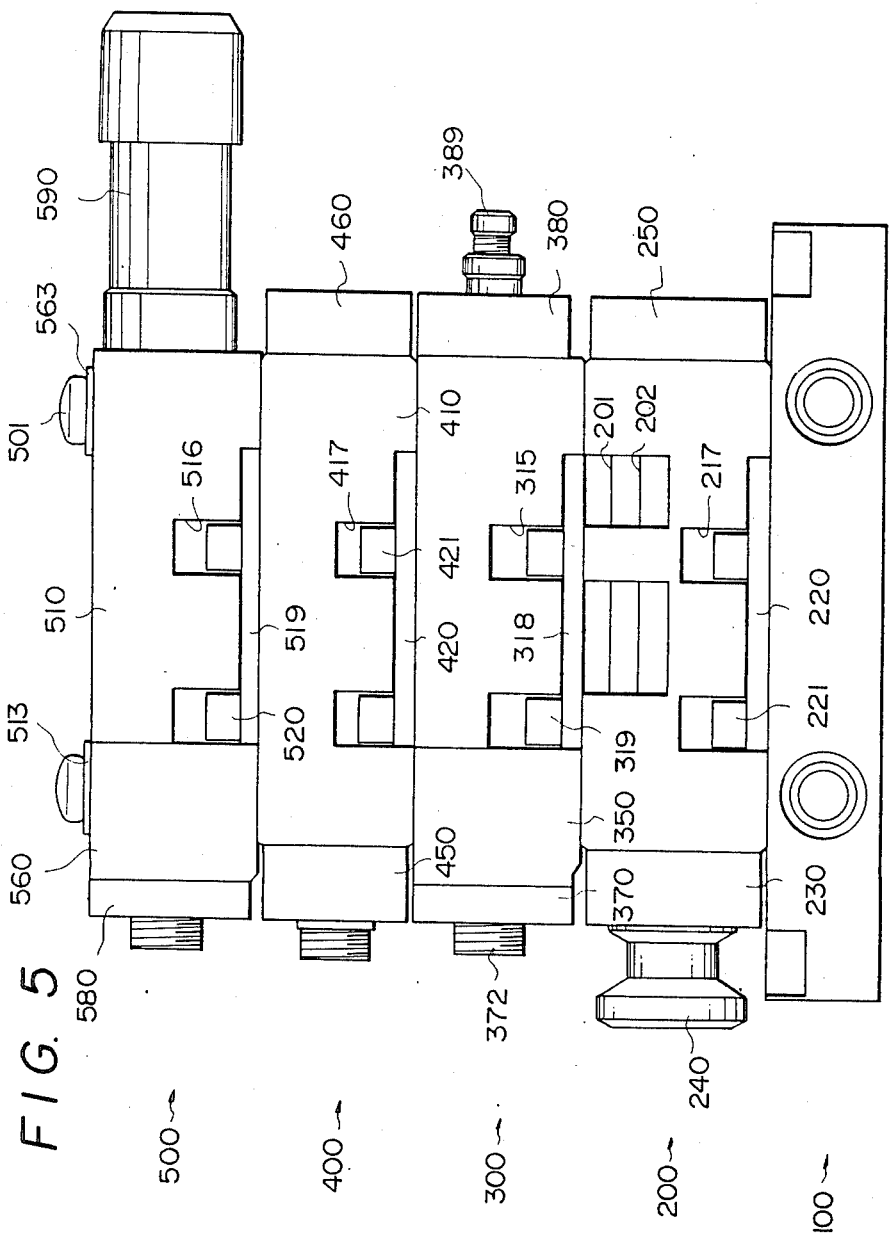
FIG. 5 is a general front elevation view of a vacuum regulating apparatus including the preferred embodiment of the vacuum valve/sensor device of the present invention.

The present invention will now be described with reference to an application of the preferred embodiment thereof, and with reference to the appended drawings. FIG. 5 is a general front elevational view of a vacuum generating and regulating apparatus including said preferred embodiment. This vacuum generating and regulating apparatus comprises, and is a functional combination of, the following main parts which are stacked in order upwards on a base assembly 100: a filter assembly 200, a vacuum cancellation valve assembly 300 for cancelling the vacuum condition supplied when it is deemed desirable to do so, a vacuum valve/sensor device 400 which is the preferred embodiment of the present invention, and a vacuum generating apparatus 500. These parts all have similar external configurations, being housed in main blocks which are generally shaped as rectangular parallelopipeds with flat tops and bottoms. They will all now be described in ascending order of location.

Figure 6:
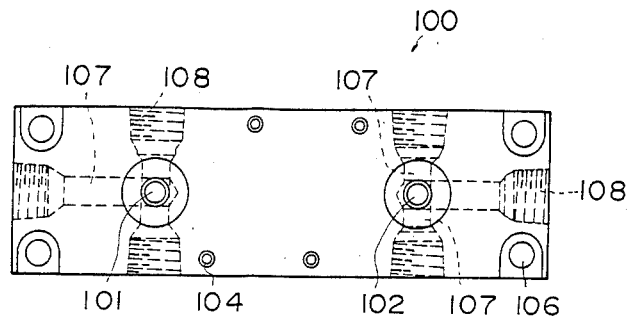
FIG. 6 is a plan view of a base assembly included in said vacuum regulating apparatus.
Figure 7:
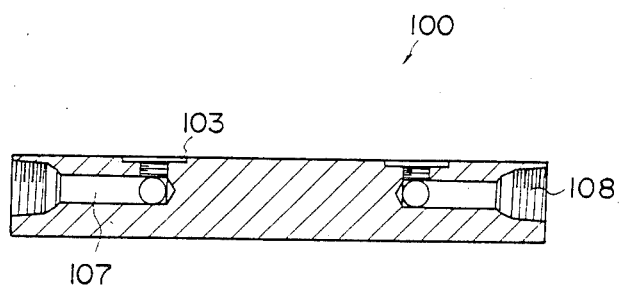
FIG. 7 is a vertical sectional view of the base assembly shown in FIG. 6.
Figure 8:
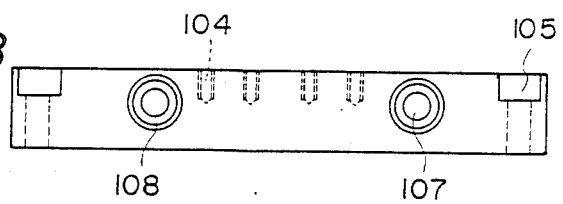
FIG. 8 is a front elevational view of the base assembly shown in FIG. 6.

First, with reference to FIGS. 6 through 8, the base assembly 100 will be described. The main block of this base assembly 100 is formed in the shape of an oblong thick plate or flattened rectangular parallelopiped, and in its upper surface there are formed as sleeved holes a high pressure air introduction hole 101 and a vacuum suction hole 102. These holes 101 and 102 are located on the approximate center line in its longitudinal or longer direction of the rectangular upper surface of the base assembly 100, on either side of the mid point thereof. At the outer ends of the high pressure air introduction hole 101 and the vacuum suction hole 102 where they open to said upper surface of the base assembly main block, there are formed stepped shapes or recesses 103 for receiving pressure sealing gaskets, not shown; these gaskets may for example be steel washers or the like which, when deformed by the clamping pressure between the base assembly 100 and the filter apparatus 200 mounted on the upper surface thereof, become somewhat squashed so as to provide hermetic airtight seals.

Further, in the upper surface of the main block of the base assembly 100, along each of the long sides of said main block, there are formed a plurality, two in the shown preferred embodiment, of anchoring holes 104, which are for anchoring and affixing the other main elements detailed above of the vacuum generating and regulating apparatus; these holes 104 are formed with female threads therein. At the four corners of said main block of the base assembly 100 there are formed four through holes 106 through the main block, for fixing said base assembly 100 and thereby the vacuum generating and regulating apparatus as a whole securely to some external member, not particularly shown, by fixing screws which are not particularly shown either; and further said main block is formed with cutaway portions or recesses 105 at the top ends of said through holes 106, for receiving the heads of said fixing screws in a countersunk fashion and thus for preventing said screw heads protruding above the upper surface of the base assembly main block. Accordingly, because the base assembly 100 is designed to be easily anchored at will in any fixed position by the use of these fixing screws, the mounting work for the vacuum generating and regulating apparatus as a whole is simplified.

From each of the high pressure air introduction hole 101 and the vacuum suction hole 102 there are provided three conduits 107 or passageways, a first one of which opens to the end surface of the main block of the base assembly 100 closest to said hole 101 or 102, while the other two open one to each of the front and back surfaces of said main block, thus extending substantially at right angles to said first conduit 107. The ends of said conduits 107, where they open to the exterior of said main block, are formed with female screw threads 108. Thus, a wide range of possibilities are available for the connection of conduits (not particularly shown) from the exterior to this vacuum generating and regulating apparatus, by the provision of these three alternatively utilizable conduits 107 with their female fixing screw threads 108 which are intended for receiving the male threads of fixing rings for such conduits. During the use of the vacuum generating and regulating apparatus, it is intended that the ones of the conduits 107 to which no conduits are to be thus connected will be blocked off by screwing blocking bolts into their threaded ends 108.

Figure 9:
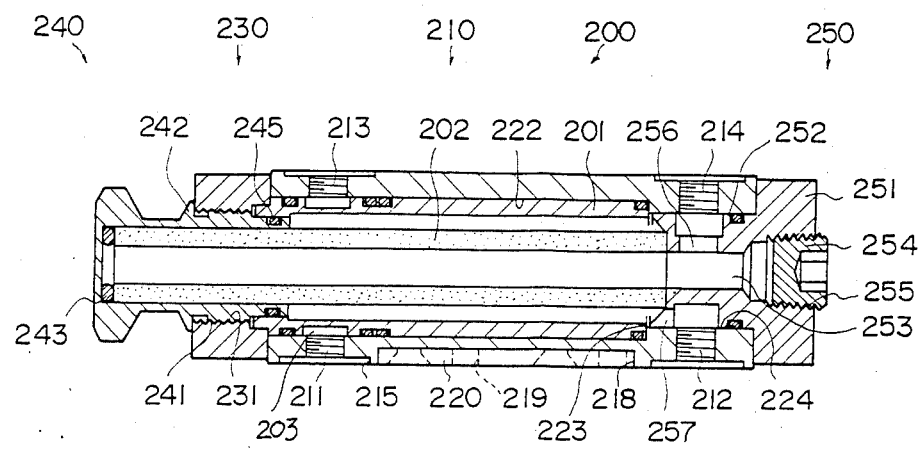
FIG. 9 is a vertical sectional view of a filter assembly included in said vacuum regulating apparatus.
Figure 10:
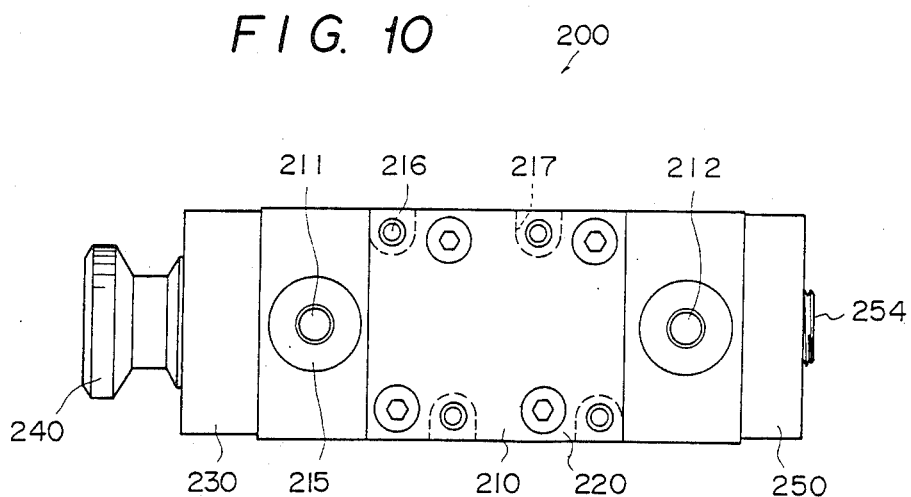
FIG. 10 is an underneath view of the filter assembly shown in FIG. 9.

Next, referring to FIGS. 9 and 10, the filter assembly 200 will be described. This filter assembly 200 comprises a main block 210 which is again formed in the shape of an oblong thick plate or flattened rectangular parallelopiped, of approximately the same width as the main block of the base assembly 100 so as to conform thereto but substantially shorter than it, and further said filter assembly 200 comprises a high pressure side filter cap 230 secured (by means not particularly shown) on the left or high pressure side of its main block 210 as seen in the drawing and a low pressure side filter cap 250 secured (again by means not particularly shown) on the right or low pressure side of its said main block 210 as seen in the drawing. In the bottom surface of the main block 210 (seen in FIG. 9) there are formed as sleeved holes a lower high pressure air hole 211 and a lower vacuum hole 212; these lower holes 211 and 212 are located on the approximate center line in its longitudinal or longer direction of the rectangular bottom surface of the filter assembly 200, on either side of the mid point thereof, in positions to correspond to the high pressure air introduction hole 101 and the vacuum suction hole 102 respectively of the main block of the base assembly 100, when the filter assembly 200 is clamped together with said base assembly 100 as shown in FIG. 5. At the outer ends of this lower high pressure air hole 211 and this lower vacuum hole 212 where they open to said lower surface of the filter assembly main block 210, there are formed stepped shapes 215 for receiving pressure sealing gaskets, not shown; these gaskets may again for example be steel washers or the like which, when deformed by the clamping pressure between the filter assembly 200 and the base assembly 100 mounted to the lower surface thereof, become somewhat squashed so as to provide hermetic seals. Further, in the top surface of this filter assembly main block 210 (not particularly shown) there are formed as sleeved holes an upper high pressure air hole 213 and an upper vacuum hole 214; again, these upper holes 213 and 214 are located on the approximate center line in its longitudinal or longer direction of the rectangular top surface of the filter assembly 200, on either side of the mid point thereof. At the outer ends of this upper high pressure air hole 213 and this upper vacuum hole 214 where they open to said upper surface of the filter assembly main block 210, there are formed similar stepped shapes 215 for receiving similar pressure sealing gaskets, not shown, for providing pressure seals against the vacuum cancellation valve assembly 300, when deformed by the clamping pressure between the filter assembly 200 and said vacuum cancellation valve assembly 300 mounted to the upper surface thereof, as shown in FIG. 5. And also, although it is not particularly so shown in the figures, in the top surface of this filter assembly main block 210 there are formed a plurality, four in the shown preferred embodiment, of anchoring holes for fixing the vacuum cancellation valve assembly 300 thereon as will be described in detail later.

Further, a rectangular portion 218 is cut away from the bottom of the main block 210 of the filter assembly 200 over a certain major portion thereof, between the lower high pressure air hole 211 and the lower vacuum hole 212. Within the bottom surface of this cutaway portion 218, along each of the long sides of the lower surface of the main block of the filter assembly 200, there are further formed a plurality, two in the shown preferred embodiment, of cutaway portions 217, as best seen in FIG. 5; the positions of these cutaway portions 217 correspond to the positions of the anchoring holes 104 formed in the upper surface of the main block of the base assembly 100. Into the rectangular shape of this cutaway portion 218 of the main block 210 there is snugly fitted a filter coupling plate 220, which is firmly attached to said main block 210 by a plurality of screws, the hexagonal heads of which are seen in FIG. 10 and are received in countersunk depressions formed in the lower surface of the filter coupling plate 220 so as not to protrude from said lower surface; but alternatively, in a variant embodiment, these heads of the screws could be allowed to protrude, and in such a case corresponding depressions would be required to be formed in the top surface of the base assembly 100 main block. Through the filter coupling plate 220 there are formed four through holes 216, the position of each one thereof corresponding to the position of one of the anchoring holes 104 formed in the upper surface of the main block of the base assembly 100, and thus also corresponding to the position of one of the cutaway portions 217 of the main block of the filter assembly 200. Before the filter coupling plate 220 is secured as described above to the filter assembly 200 main block 210, through each of these holes 216 there is passed a screw 221 to point in the downwards direction (see FIG. 5), so that, after said plate 220 is secured to said main block 210 of the filter assembly 200, the heads of these screws 221 are relatively loosely received in the cutaway portions 217. When subsequently the filter assembly 200 is required to be fixed to the base assembly 100, the operator positions said filter assembly 200 in place, then threads each of the screws 221 into its corresponding one of the threaded holes 104 in the upper surface of the base assembly main block, and then tightens up each of said screws 221 by accessing its head, which is preferably an Allen type hexagonal head, with a hex or Allen wrench (not particularly shown) via the cutaway 217 in which said head is received. Accordingly, because the filter assembly 200 can thus be easily fitted to and removed from the base assembly 100 by the use of these fixing screws 221, without any requirement for attaching or detaching any of the vacuum cancellation valve assembly 300, the vacuum valve/sensor device 400, or the vacuum generating apparatus 500 from said filter assembly 200, the assembly work for the vacuum generating and regulating apparatus as a whole is simplified, and the disassemblability and the servicability thereof are enhanced.

Through the main block 210 of the filter assembly 200 there is pierced, extending from the left side thereof in the figures to just before the upper and lower vacuum holes 214 and 212, a filter housing pipe insertion hole or bore 222, to the side surface of which the upper and lower high pressure air holes 213 and 211 open. And from its right side, through said main block 210 in the drawing, there is pierced a vacuum cap insertion hole 224, of somewhat smaller diameter than said filter housing pipe insertion hole 222 and substantially coaxial therewith, which extends past the upper and lower vacuum holes 214 and 212 to meet the end of said filter housing pipe insertion hole 222 and thus to define a step shape 223. Into the filter housing pipe insertion hole 222 there is snugly fitted a filter housing pipe 201 which is made of a transparent material such as synthetic resin or glass, and this filter housing pipe 201 is held in said filter housing pipe insertion hole 222 against the step shape 223 by the high pressure side filter cap 230 which axially clamps it by being fixed against the left side in the figure of the main body 210 of the filter assembly 200. This high pressure side cap 230 is formed with a central axial threaded hole 231 of slightly larger diameter than the filter housing pipe 201 but of smaller diameter than the filter housing pipe insertion hole 222, and a filter holding cap 240 is formed with a male thread shape 241 by which it is is removably screwed into this threaded hole 231, so as to retain a hollow cylindrical filter 202, which has a cylindrical inner space within it, within the internal space of the filter housing pipe 201, a certain hollow cylindrical gap being left between the outer surface of said filter 202 and the inner surface of said filter housing pipe 201. In other words, by removing the filter holding cap 240 from the threaded hole 231, it is possible to withdraw the filter 202 from the left side of the assembled vacuum generating and regulating apparatus as seen in FIG. 5, without disturbing any other parts thereof. On the other hand, when it is decided to fit a new filter 202 to the filter assembly 200, then the old filter 202 is discarded, and the new filter 202 is inserted into an axial cylindrical hole formed in the filter holding cap 240, so as to be held snugly therein and so as to rest against an elastic ring member 243 provided at the bottom of said hole. Then, the filter 202 is approached to and inserted into the internal space of the filter housing pipe 201, and is pushed thereinto, and the male thread 241 of the filter holding cap 240 is threaded into and screwed into the female thread 231 of the high pressure side cap 230, so that the right end in FIG. 9 of the filter 202 comes to abut against the inner end of the low pressure side filter cap 250, to be described shortly, with the inner tip end portion of the filter holding cap 240 fitting snugly into the end of the filter housing pipe 201 and making a good and airtight seal thereagainst with the aid of a sealing member 245. This screwing of the male thread 241 into the female thread 231 is put a stop to by a flange portion 242 formed on the outside of the filter holding cap 240 coming into contact with the outer end surface of the high pressure side cap 230, and the parts are so dimensioned that in this position of the members the filter 202 is somewhat axially compressed, to an appropriate amount, between the filter holding cap 240 with the interposition of the elastic ring member 243 which provides a springing and cushioning effect, and the inner end of the low pressure side filter cap 250. Thereby, the aforementioned hollow cylindrical gap is defined between the outer surface of the filter 202 and the inner surface of the filter housing pipe 201.

The upper and lower high pressure air and vacuum holes 211, 212, 213, and 214 are connected together, with the interposition therebetween of the filter 202, as follows. An annular ring shaped groove 203 is formed circumferentially around the filter housing pipe 201, at an axial position therealong corresponding to the upper high pressure air hole 213 and the lower high pressure air hole 211, and communicates them together around said pipe 201; the sides of this groove 203 are sealed by annular gaskets, and a further annular gasket is provided at the end of the filter housing pipe 201, between it and the step shape 223 against which it abuts. Thus, the upper and lower high pressure air holes 213 and 211 are directly communicated together and are not communicated to any other part of the apparatus. Further, the connections of the upper and lower vacuum holes 214 and 212 are defined by the low pressure side filter cap 250, a cylindrical end portion of which is fitted into the vacuum cap insertion hole 224 and is sealed thereagainst by an annular gasket 252, and a flange portion 251 of which is abutted against the right side in FIG. 9 of the main block 210 of the filter assembly 200, in the following way. An upper radial aperture 256 and an axial aperture 253 are formed through said cylindrical end portion of said low pressure side filter cap 250 and their series combination communicates the upper vacuum hole 214 with the internal space within the filter 202, the outer end of said axial aperture 253 being closed by a blocking screw 254 fixed in by a male and female thread combination 255. And an axial groove 257 is formed on the lower portion of said cylindrical end portion of said low pressure side filter cap 250, the axially inner end of said groove 257 communicating with the aforementioned hollow cylindrical gap defined between the outer surface of the filter 202 and the inner surface of the filter housing pipe 201, while the axially outer end of said groove 257 communicates with the lower vacuum hole 212. Thereby, as will be seen from what follows, air which is sucked in through the lower vacuum hole 212 from the upper vacuum hole 107 of the base assembly 100 passes through the groove 257, into the hollow gap between the filter 202 and filter housing pipe 201, through the material of the filter 202 while being cleaned thereby, into the internal space within the filter 202, along said space to enter into the axial aperture 253 of the cylindrical end portion of said low pressure side filter cap 250, and thence through the upper radial aperture 256 therein to pass into the upper vacuum hole 214. Thereby, a filter action is provided for said sucked vacuum (more properly, air at low pressure), and dust, dirt, and the like therein are effectively removed.

And cutaways or windows are provided through the upper portions of front and back surfaces of the main block 210, as particularly shown in FIG. 5, so as to allow an operator to view from the outside of the apparatus, without disturbing any parts thereof, the transparent filter housing pipe 201 and through it the filter 202, in order to inspect the condition of said filter 202 to see whether or not it is contaminated. Thereby, timely replacement of the filter 202 can be performed without likelihood of error. Particularly, in this shown construction, since the direction of the flow of low pressure air is from the outside of the cylindrical filter 202 to the inside space defined therein, dirt and dust and the like which are removed from the air flow by the filter 202 tend to be lodged on the outside cylindrical surface of the filter 202, thus being very easily visible from the outside through the cutaways and the transparent filter housing pipe 201. Accordingly, the observation of the condition of contamination of the filter 202 from outside is made more reliable.

Further, in the shown construction, since the filter 202, one end of which abuts against the low pressure side filter cap 250, is held by its other end by said end being snugly and relatively tightly inserted into the interior hole of the filter holding cap 240, this means that, when it comes to be time to change the filter 202, and the filter holding cap 240 is unscrewed from the high pressure side cap 230, then by simply pulling on said filter holding cap 240 the filter 202 can be pulled out from the main body of the filter assembly 200. And, even if through some mischance the end of the filter 202 should slip out from being thus held in said interior hole of said filter holding cap 240, still, since said end of the filter 202 remains as projecting outwards from the high pressure side filter cap 230, it will be relatively easy for the operator to pull by hand on this end of said filter 202, thus withdrawing the filter 202 from the filter assembly 200 by hand. In summary, in the shown construction, the changing of the filter 202 is made to be extremely easy.

And yet further, in the shown construction, although the filter 202 intervenes in the direct line between the upper and lower high pressure air holes 213 and 211, since the annular groove 203 is provided around the filter housing pipe 201, nevertheless these high pressure air holes 211 and 213 are reliably communicated together, and an extremely low resistance is provided to the flow of air between them.

Figure 12:
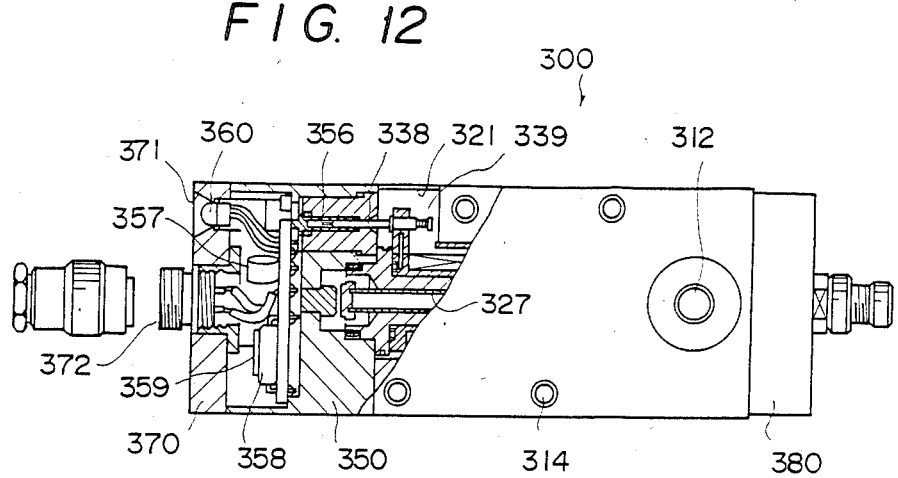
FIG. 12 is a partially cut away plan view of the valve assembly shown in FIG. 11.
Figure 13:
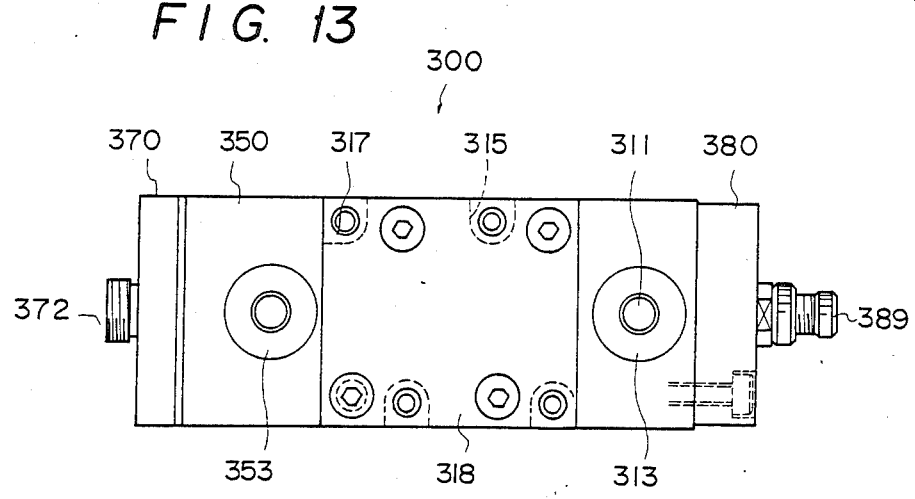
FIG. 13 is an underneath view of the valve assembly shown in FIG. 11.

The vacuum cancellation valve assembly 300 will now be described with reference to FIGS. 11 through 13. This vacuum cancellation valve assembly 300 comprises a main block 310 which is again formed in the shape of an oblong thick plate or flattened rectangular parallelopiped, of approximately the same width as the main block of the filter assembly 200 so as to conform thereto but substantially shorter than it, and further said vacuum cancellation valve assembly 300 comprises a high pressure side cap 350, secured (by means not particularly shown) on the left or high pressure side of its main block 310 as seen in the drawing and located there by a position register pin 346 fitted into the lower portion of said main block 310 and inserted into a pin location hole 362 formed in said cap 350, an outer end cap mounted to said high pressure side cap 350, and a low pressure side cap 380 secured (again by means not particularly shown) on the right or low pressure side of its said main block 310 as seen in the drawing. In the bottom surface of the main block 310 (seen in FIG. 12) there is formed as a sleeved hole a lower vacuum hole 311, and in the bottom surface of the high pressure side cap 350 there is formed as a similar sleeved hole a lower high pressure air hole 351; these lower holes 351 and 311 are as before located on the approximate center line in its longitudinal or longer direction of the rectangular bottom surface of the vacuum cancellation valve assembly 300, on either side of the mid point thereof, in positions to correspond to the upper high pressure air hole 213 and the upper vacuum hole 214 respectively of the main block 210 of the filter assembly 200, when the vacuum cancellation valve assembly 300 is clamped together with said filter assembly 200 as shown in FIG.

5. At the outer ends of this lower high pressure air hole 351 and this lower vacuum hole 311 where they open to said lower surfaces of the vacuum cancellation valve assembly main block 310 and of the side cap 350 respectively, there are formed stepped shapes or recesses 313 (see FIG. 13) for receiving pressure sealing gaskets, not shown; these gaskets may again for example be steel washers or the like which, when deformed by the clamping pressure between the vacuum cancellation valve assembly 300 and the filter assembly 200 mounted to the lower surface thereof, become somewhat squashed so as to provide hermetic seals. Further, in the top surface of this vacuum cancellation assembly main block 310, there is formed as a sleeved hole an upper vacuum hole 312, and in the top surface of the high pressure side cap 350 there is formed as a similar sleeved hole an upper high pressure air hole 352; again, these upper holes 352 and 312 are located on the approximate center line in its longitudinal or longer direction of the rectangular top surface of the vacuum cancellation valve assembly 300, on either side of the mid point thereof. At the outer ends of this upper high pressure air hole 352 and this upper vacuum hole 312 where they open to said upper surfaces of the vacuum cancellation valve assembly main block 310 and of the side cap 350 respectively, there are formed similar stepped shapes 313 for receiving similar pressure sealing gaskets, not shown, for providing pressure seals against the vacuum valve/sensor device 400, when deformed by the clamping pressure between the vacuum cancellation valve assembly 300 and said vacuum valve/sensor device 400 mounted to the upper surface thereof, as shown in FIG. 5. And also in the top surface of this vacuum cancellation valve assembly main block 310 there are formed a plurality, four in the shown preferred embodiment, of anchoring holes 314 for fixing the vacuum valve/sensor device 400 thereon as will be described in detail later.

Further, a rectangular portion 316 is cut away from the bottom of the main block 310 of the vacuum cancellation valve assembly 300 over a certain major portion thereof, from its left side to the lower vacuum hole 311. Within the bottom surface of this cutaway portion 316, along each of the long sides of the lower surface of the main block of the vacuum cancellation valve assembly 300, there are further formed a plurality, two in the shown preferred embodiment, of cutaway portions 315, as best seen in FIG. 5; the positions of these cutaway portions 315 correspond to the positions of the abovementioned anchoring holes, not shown, formed in the upper surface of the main block 210 of the filter assembly 200. Into the rectangular shape of this cutaway portion 316 of the vacuum cancellation valve main block 310 there is snugly fitted a vacuum cancellation valve coupling plate 318, which is firmly attached to said main block 310 by a plurality of screws, the hexagonal heads of which are seen in FIG. 13, and are received in countersunk depressions formed in the lower surface of the vacuum cancellation valve coupling plate 318 so as not to protrude from said lower surface; again, alternatively, in a variant embodiment, these heads of the screws could be allowed to protrude, and in such a case corresponding depressions would be required to be formed in the top surface of the filter assembly 200 main block 210. Through the vacuum cancellation valve coupling plate 318 there are formed four through holes 317, the position of each one thereof corresponding to the position of one of the abovementioned anchoring holes formed in the upper surface of the main block 210 of the filter assembly 200, and thus also corresponding to the position of one of the cutaway portions 315 of the main block of the vacuum cancellation valve assembly 300. Before the vacuum cancellation valve coupling plate 318 is secured as described above to the filter assembly 200 main block 210 by the screws 394, through each of these holes 317 there is passed a screw 319 to point in the downwards direction (see FIG. 5), so that, after said coupling plate 318 is secured to said main block 310 of the vacuum cancellation valve assembly 300, the heads of these screws 319 are relatively loosely received in the cutaway portions 315. When subsequently the vacuum cancellation valve assembly 300 is required to be fixed to the filter assembly 200, the operator positions said vacuum cancellation valve assembly 300 in place, then threads each of the screws 319 into its corresponding one of the threaded holes (not particularly shown) in the upper surface of the filter assembly main block 210, and then tightens up each of said screws 319 by accessing its head, which is preferably an Allen type hexagonal head, with a hex or Allen wrench (not particularly shown) via the cutaway 315 in which said head is received. Accordingly, because the vacuum cancellation valve assembly 300 can thus be easily fitted to and removed from the filter assembly 200 by the use of these fixing screws 319, without any requirement for attaching or detaching the filter assembly 200 from the base assembly 100, or for attaching or detaching either the vacuum valve/sensor device 400 or the vacuum generating apparatus 500 from said vacuum cancellation valve assembly 300, the assembly work for the vacuum generating and regulating apparatus as a whole is simplified, and the disassemblability and the servicability thereof are enhanced.

Figure 11:
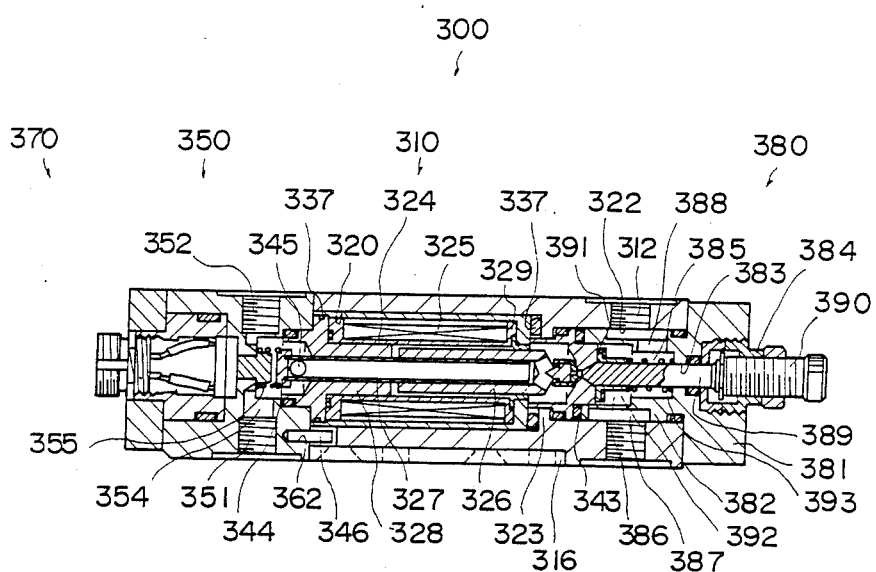
FIG. 11 is a vertical sectional view of a vacuum cancellation valve assembly included in said vacuum regulating apparatus.

Through the main block 310 of the vacuum cancellation valve assembly 300 there is pierced, extending from the left side thereof in the figures to just before the upper and lower vacuum holes 312 and 311, a solenoid housing hole or bore 320, and, as best seen in FIG. 11, an aperture 321 is formed in the left side of said main block for receiving parts which will be detailed shortly. And from its right side, through said main block 310 in the drawing, there is pierced a vacuum side cap insertion hole or axial enlarged opening 322, of somewhat smaller axial length size than the solenoid housing hole 320, which extends past the upper and lower vacuum holes 312 and 311 to communicate with the end of the solenoid housing hole 320, thus to define a step flange 323 which extends somewhat in the inward direction at their meeting point. Into the solenoid housing hole 320 there is fitted a solenoid 325 which is wound on a bobbin 324, with a mounting member 329, formed as a hollow tube, inserted between the outer surface of the solenoid 325 and the inner surface of said solenoid housing hole 320 to promote tight and snug fitting between these members. Into the left end of the bobbin 324 as seen in the figure, i.e. into its high pressure end, there is inserted a support member 328 formed with an axial hole, said support member 328 being held in place by the pressure of the fixing of the high pressure side cap 350 and thereby axially holding the bobbin 324, the solenoid 325, and the mounting member 329 in place within the solenoid housing hole 320 by pressing them against the aforementioned step flange 323. And sealing gaskets 337 are provided for making air tight seals between the mounting member 329 and said step flange 323, and between said mounting member 329 and the support member 328; also, a sealing gasket is provided for making an air tight seal between the support member 328 and the high pressure side cap 350, when said cap 350 is fitted to the main block 310 as will be explained shortly. The support member 328 slidably supports a movable tube member 327 in its said axial hole or bore, said tube member 327 extending through the axial hole bore of the bobbin 324 and through the solenoid 325 to project, in the leftward direction, into a chamber 354 defined within the high pressure side cap 350; and on the right end in the figure of the tube member 327 there is mounted a metallic solenoid core 326, with a slight clearance being left between said solenoid core 326 and the interior surface of the bobbin 324. On the left end in the figure of the tube member 327 there is fitted a spring receiving member 344, and a compression coil spring 355 is fitted between said spring receiving member 344 and the inner side of the high pressure side cap 350, so as to bias the tube member 327 and the solenoid core 326 mounted thereon in the rightwards direction in the figure. A side hole or opening 345 is formed in the wall of the left hand end portion of the tube member 327, so as to communicate the space within it to the chamber 354.

Referring now to the high pressure side arrangements, both the upper high pressure air hole 352 and the lower high pressure air hole 351 communicate with said chamber 354, thus being communicated freely with one another with substantially no flow resistance between them, and so that, further, high pressure air is substantially freely supplied via the hole 345 to the interior of the tube member 327. Within the aperture 321 formed as mentioned above in the left side of the main block 310 there is housed a molded portion 339 to which a terminal pin 338 is secured. This terminal pin 338 serves as one terminal of the solenoid 325, being connected to one side of the coil thereof (the other side of said coil is connected to earth), and projects out from the main block 310 in the longitudinal direction of the apparatus, leftwards in the figure, so as to be closely fitted into a socket 356 fitted in the high pressure side cap 350 to make electrical connection therewith. Thereby, the cap 350 may be easily mounted and demounted to the main block 310 of the vacuum cancellation valve assembly 300, being positionally located by the previously mentioned locating pin 346, without any problems arising regarding the establishment of electrical connections to the solenoid 325 thereof. In a recess formed on the outer side of the high pressure side cap 350, there is housed an internal electrical circuit of a per se known type for controlling the flow of current to the solenoid 325 via the socket 356 and earth, comprising a varistor 357, a resistor 358, a diode 359, and a monitor lamp 360 for providing a visible indication of operation. And the outer end cap 370 is secured over this cavity for the purpose of protecting this electrical circuit therein, said cap 370 being provided with an aperture 371 for allowing the monitor lamp 360 to be observed and a socket 372 for making electrical connection from the outside to said electrical circuit, as by a plug (see FIG. 12).

Referring now to the low pressure side arrangements, the vacuum side cap 380, which is secured in the vacuum side cap insertion hole 322 on the right or low pressure side of the main block 310, is configured, in terms of its function in cooperation with nozzle arrangements which will be described later, so as to cancel the vacuum conditions in the case of supply of high pressure air according to the action of the solenoid 325, and further the speed of cancellation of said vacuum conditions is controllable. Also, in such a case, high pressure air does not flow out of the vacuum cancellation valve assembly 300 in the backwards direction towards the vacuum generating apparatus 500. The concrete means by which these functions are attained are as follows.

The vacuum side cap 380 comprises a larger end portion 381 which is of larger size than the insertion hole or bore 322 and accordingly remains outside it and is abutted against the end surface of the main block 310—this end portion 381 is substantially of the same width and height as said end surface of said main block 310, so as to mate cleanly thereagainst—and a smaller insertion portion 382 which is fitted into said insertion hole 322 and closely cooperates therewith. The end portion 381 is formed with a cylindrical axially extending slide hole 383, in which an adjustment rod 389 is closely and slidably fitted, and the left end in the figure of this slide hole 383 opens to the leftward portion 385 in the figure of a larger diameter hole formed in the insertion portion 322 and extending through it to its left end. The slide hole 383 is substantially coaxial with the central hole of the solenoid 325 and with the tube member 327, when of course the side cap 380 is fitted to the main block 310 of the vacuum cancellation valve assembly 300. The leftward portion 386 of said larger diameter hole formed in the insertion portion 382 is of larger diameter than its rightward portion 385, and a step shape is defined between these portions 385 and 386. The insertion portion 382 is formed with an aperture 388 which communicates the upper vacuum hole 312 opens to the smaller diameter rightward hole portion 385, and is also formed with an aperture 387 which communicates the lower vacuum hole 311 opens to the larger diameter leftward hole portion 386. The adjustment rod 389 is provided at its outer end portion with a radially enlarged screw portion 390, and its inner or left end portion is formed in a conical shape. A screw element 384 couples the adjustment rod 389 to a threaded cavity formed in the outside of the vacuum side cap 380, so that the position in its axial direction of said adjustment rod 389 can be set by adjusting said screw element 384.

At the left end portion of the larger diameter leftward hole portion 386 there is fitted a valve seat member 340 (see FIG. 14), which is securely held in place by being clamped between the leftmost end of the insertion portion 382 of the vacuum side end cap 380 and the aforementioned step flange 323 which delimits between the solenoid housing hole 320 and the insertion hole 322, and which is sealed thereagainst by gaskets 343. The valve seat member 340 is formed with a valve hole 341 through its axial central portion, which has a conical shape 342 facing towards the adjustment rod 389 and confronting its conical tip portion. Thus, the only communication between the solenoid housing hole 320 and the apertures in the vacuum cap insertion portion 382 is through this valve hole 341, and, by axially adjusting the position of the rod 389, the distance between its conical tip and the conical shape 342 of the right side of the valve seat member 340 can be varied, thus varying the flow resistance through the valve hole 341; the position of these elements shown in FIG. 11 is that in which the conical tip of the rod 389 is completely closing the valve hole 341. And over the adjustment rod 389 there is slidably fitted a movable valve element 392, which has a cylindrical sliding portion on its right end in the figure and a radially extending flange portion 391 on its left end. This valve element 392 is biased in the leftward direction in the figure by a compression coil spring 393, so that, when it is not otherwise impelled in the rightward direction and is positioned in its leftmost position along the adjustment rod 389, it presses against the flat surface of the valve seat member 340 around the said conical shape 342 formed thereon and with the cooperation of the adjustment rod 389 blocks passage of air through the valve hole 341 from the solenoid housing hole 320 to the apertures in the vacuum cap insertion portion 382, while on the other hand allowing free passage of low pressure air (vacuum) between the larger diameter leftward hole portion 386 of the vacuum cap insertion hole 322 and thence also to the smaller rightward portion 385 thereof. This state of affairs is always the case when no air is coming through the valve hole 341 from the left side of the apparatus, and in this case the upper vacuum hole 312 and the lower vacuum hole 311 are freely communicated to one another, via the apertures 387 and 388 and the hole portions 385 and 386. On the other hand, when the valve element 392 is forcibly pushed against the action of the spring 393 so as to be positioned in its rightmost position along the adjustment rod 389, then, although as before air is allowed to pass through the valve hole 341 from the solenoid housing hole 320 to the larger diameter hole portion 386, the flange portion 391 of the valve element 392 presses against the step shape or shoulder defined between the hole portions 385 and 386, and thereby with the cooperation of the adjustment rod 389 blocks passage of air from said larger diameter leftward hole portion 386 to the smaller rightward portion 385 thereof, and accordingly blocks the flow of air between the upper vacuum hole 312 and the lower vacuum hole 311. And in this condition of the parts communication is provided between the valve hole 341 and the lower vacuum hole 311, via the leftward hole portion 386 of the vacuum cap insertion hole 322 and the aperture 387, but not between said valve hole 341 and the upper vacuum hole 312.

Next, referring to FIGS. 14 through 16, the particular nozzle structures at the end of the solenoid core 326, including the valve seat member 340, will be explained; these figures show the same parts in three different actuation states. The right end portion in the figures of the solenoid core 326 is first tapered down at a portion 330 at which the interior space within the tube member 327 is vented, and thence is formed with an extension at the end of which there is formed an enlarged portion 331 which is fitted and held inside a cavity defined within a valve element 332. This valve element 332 is formed with a hollow cylindrical body portion 333, a flange 334 which extends somewhat radially inward from the left end in the figures of said body portion 333, and a tip portion 336 with a central hole 335 formed through it: this tip portion 336 has a conically shaped outer surface 398 which cooperates with a conical surface formed on the left side in the figure of the valve seat member 340 around the valve hole 341 therein. The valve element 332 is loosely fitted over this enlarged portion 331 at the tip end of the solenoid core 326, since its internal space is somewhat larger both in the longitudinal and the transverse directions than said enlarged tip end portion 331, and further this flange 334 prevents said valve element 332 from coming off from said solenoid core 326.

Figure 14:
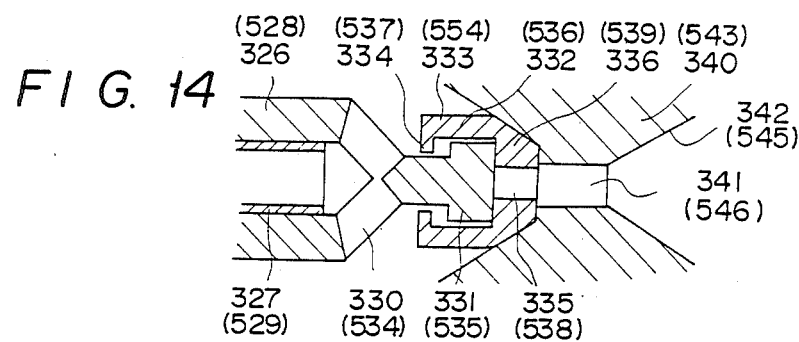
FIG. 14 is an enlarged view of a solenoid core tip portion and of a valve element associated therewith, of a type incorporated in said vacuum cancellation valve assembly and also in a vacuum generating apparatus included in said vacuum regulating apparatus, shown in their positions in which no actuating electrical energy is being supplied to a solenoid of said vacuum cancellation valve assembly.

FIG. 14 shows these parts in their positions in which no electrical energy is being supplied to the solenoid 325, and accordingly by the biasing effect of the compression coil spring 355 the solenoid core 326 and the tube member 327 are pushed to their rightmost positions as seen in the figures. In this state, the enlarged portion 331 of the solenoid core 326 closes the leftmost end of the central hole 335 of the tip portion 336 of the valve element 332; and further the conical surface of this tip portion 336 is pressed against the conical surface of the valve seat member 340. Accordingly, although plentiful high pressure air is transmitted to the volume around the valve element 332 through the interior space of the tube member 327 from the chamber 354, this air is substantially completely prevented from passing into the aperture 341 of the valve seat member 340, and accordingly no air blows from the left side of said valve seat member 340 past the tip end portion of the adjustment rod 389. Thus, there is no blowing force available for lifting the valve element 392 away from said valve seat member 340, and thereby as explained above the upper vacuum hole 312 and the lower vacuum hole 311 are freely communicated to one another, thus freely allowing the transmission of vacuum with no admixture of high pressure air thereinto. This is the normal working state of the apparatus.

Figure 15:
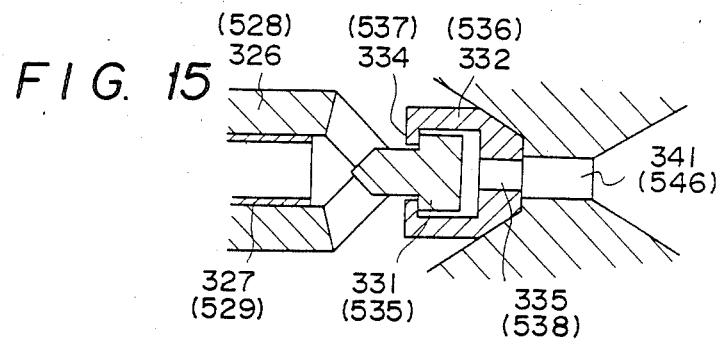
FIG. 15 is a similar view of said parts in their positions shortly after activation of said solenoid.

FIG. 15 shows the parts in their positions shortly after activation of the solenoid 325 before the pressure has yet equalized, and in this state the biasing effect of the compression coil spring 355 is somewhat overcome by the attraction of said solenoid 325, so that the solenoid core 326 and the tube member 327 are somewhat pulled to the left from their FIG. 14 positions. In this state, the enlarged portion 331 of the solenoid core 326 is pulled leftwards in the cavity in the valve element 332, and thereby opens the hole 335 in the tip portion 336 thereof; but said valve element 332 is not yet displaced leftwards, being held in place by air pressure on its right side, so that the conical surface of its tip portion 336 continues to be pressed against the conical surface of the valve seat member 340. Accordingly, the high pressure air is allowed to pass to a certain extent into the aperture 341 of the valve seat member 340 through small gaps between the enlarged solenoid core portion 331 and the valve element 332, and accordingly this moderate flow of high pressure air blows out from the right side of said valve seat member 340 past the tip end portion of the adjustment rod 389. Thus, this provides a sufficient blowing force for positioning the valve element 392, against the action of the spring 393 which is completely overcome, to its rightmost position along the rod 389. Thereby as explained above the upper vacuum hole 312 and the lower vacuum hole 311 become discommunicated from one another, thus allowing the transmission of this admixture of high pressure air into the lower vacuum hole 311 but not into the upper vacuum hole 312. This state of the apparatus allows the pressure difference between the high pressure side and the lower part of the low pressure side thereof to be gradually and progressively diminished, thus inducing progressive cancellation of the vacuum supplied to the apparatus to which this apparatus is connected, while conserving the vacuum in the upper part of said low pressure side of said apparatus.

Figure 16:
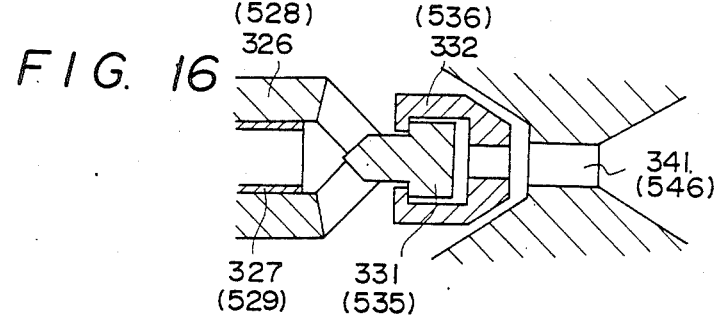
FIG. 16 is a similar view of said parts in their positions when said solenoid has been activated for some time.

FIG. 16 shows the parts in their positions when the solenoid 325 has been activated for some time. In this state, because of the rise of the pressure at the right side of the valve seat member 340, the valve element 332 is at least partly released from being pushed by pressure around its leftward portions against the conical valve seat, and this allows the biasing effect of the compression coil spring 355 to now be completely overcome by the attraction of the solenoid 325, so that the solenoid core 326 and the tube member 327 are pulled to their fully leftmost positions. In this state, the enlarged portion 331 of the solenoid core 326 further pulls leftwards on the flange 334 of the valve element 332, and thereby displaces said valve element 332 leftwards against the action of the possible residual air pressure on its left side, so that now the conical surface of its tip portion 336 is withdrawn from the conical surface of the valve seat member 340. Accordingly, the high pressure air is allowed to flow in great volume into the aperture 341 of the valve seat member 340, and accordingly this high flow of high pressure air blows out from the right side of said valve seat member 340 past the tip end portion of the adjustment rod 389, again with sufficient force for lifting the valve element 392 to its leftmost position along said rod 389. Thus, still the upper vacuum hole 312 and the lower vacuum hole 311 are kept discommunicated from one another, thus maintaining the condition of transmission of high pressure air into the lower vacuum hole 311 but not into the upper vacuum hole 312. This state of the apparatus ensures that the pressure in the lower part of the vacuum side of the apparatus, i.e. supplied out through the lower vacuum hole 311 to the filter assembly 200 and the base assembly 100 and out through the vacuum sucking conduits 108 connected to the vacuum suction hole 102 to a device such as a sucking cup that makes use of vacuum, is positively and definitely reduced to zero, while at the same time preventing air at atmospheric pressure from flowing to the upper part of the vacuum side of the apparatus, i.e. out through the upper vacuum hole 312 to the vacuum valve/sensor device 400 and to the vacuum generating apparatus 500, thus conserving the vacuum therein.

As compared to a possible alternative but less sophisticated construction in which the valve element 332 would be directly pulled by the solenoid 325, i.e. typically would be integrally formed with the solenoid core 326, this construction as shown above allows the movement of this valve element 332 with almost no resistance, due to the prior venting of air in the FIG. 15 position of the parts, and hence the burden imposed on the solenoid 325 is relatively low. Accordingly, the size of the solenoid 325 may be reduced, and this means that the device can use less energy.

Also, when the vacuum cancellation valve as shown above diminishes and cancels the vacuum condition in its negative pressure side by the activation of the solenoid 325, since the movable metal core 326 of this solenoid 325 is secured to the movable pipe member 327 through which the entire air flow for this vacuum cancellation flows, this means that the solenoid 325 is cooled by the air flow, and even if the solenoid 325 is operated at high power there is no reduction in its efficiency due to heating up thereof. Furthermore, the solenoid 325 also is cooled by conduction of heat through the mounting member 329 to the main block 310, and accordingly the entire vacuum cancellation valve assembly 300 is utilized as a radiator means. This makes the prevention of loss of effectiveness of the device due to heating up thereof all the more assured.

Further, according to the shown construction, because the regulation of the air flow through the aperture 341 of the valve seat member 340 is easily performed from the outside of the device by the operator adjusting the axial position of the adjustment rod 389 by turning its exterior screw portion 390, which regulates the position of the conical tip of said rod 389 relative to the conical shape 342 formed on the valve seat member 340 around its aperture 341, thereby the time period between the starting of activation of the solenoid 325 to the complete cancellation of vacuum conditions in the negative pressure side of the apparatus can be regulated at will. And, yet further, because of the arrangements including the valve element 392 which as described above controls the communication between the hole portions 385 and 386 and interrupts such communication when high pressure air is being emitted through the valve aperture 341, this means that such emitted air is substantially entirely applied to the progressive cancellation of the vacuum in the portion of the apparatus downwards of the vacuum cancellation valve assembly 300, with substantially none of said air passing upwards of said vacuum cancellation valve assembly 300 to reduce the vacuum in this portion of the apparatus, and accordingly the efficiency of air and vacuum use provided by the shown construction is good.

Next, the vacuum valve/sensor device 400, which is the preferred embodiment of the present invention, will be described with reference to FIGS. 1 through 4. This vacuum valve/sensor device 400 comprises a main block 410 which is again formed in the shape of an oblong thick plate or flattened rectangular parallelopiped, of approximately the same width as the main block of the vacuum cancellation valve assembly 300 so as to conform thereto, and further said vacuum valve/sensor device 400 comprises a high pressure side cap 450 secured (by means not particularly shown) on the left or high pressure side of its main block 410 as seen in the drawing and a low pressure side cap 460 secured (again by means not particularly shown) on the right or low pressure side of its said main block 410 as seen in the drawing. In the bottom surface of the main block 410 (seen in FIG. 1) there are formed as sleeved holes a lower high pressure air hole 411 and a lower vacuum hole 412; these lower holes 411 and 412 are again located on the approximate center line in its longitudinal or longer direction of the rectangular bottom surface of the vacuum valve/sensor device 400, on either side of the mid point thereof, in positions to correspond to the upper high pressure and vacuum holes 352 and 312 respectively of the vacuum cancellation valve assembly 300, when the vacuum valve/sensor device 400 is clamped together with said vacuum cancellation valve assembly 300 as shown in FIG. 5. At the outer ends of this lower high pressure air hole 411 and this lower vacuum hole 412 where they open to said lower surface of the main block 410, there are formed stepped shapes 415 for receiving pressure sealing gaskets, not shown; these gaskets may again for example be steel washers or the like which, when deformed by the clamping pressure between the vacuum valve/sensor device 400 and the vacuum cancellation valve assembly 300 mounted to the lower surface thereof, become somewhat squashed so as to provide hermetic seals. Further, in the top surface of this vacuum valve/sensor device main block 410, as partially shown in FIG. 3, there are formed as sleeved holes an upper high pressure air hole 413 and an upper vacuum hole 414; again, these upper holes 413 and 414 are located on the approximate center line in its longitudinal or longer direction of the rectangular top surface of the vacuum valve/sensor device 400, on either side of the mid point thereof. At the outer ends of this upper high pressure air hole 413 and this upper vacuum hole 414 where they open to said upper surface of the main block 410, there are formed similar stepped shapes 415 for receiving similar pressure sealing gaskets, not shown, for providing pressure seals against the vacuum generating apparatus 500, when deformed by the clamping pressure between the vacuum valve/sensor device 400 and said vacuum generating apparatus 500 mounted to the upper surface thereof as shown in FIG. 5. And also in the top surface of this vacuum valve/sensor device main block 410 there are formed a plurality, four in the shown preferred embodiment, of anchoring holes 416 for fixing said vacuum generating apparatus 500 thereon as will be described in detail later.

Figure 4:
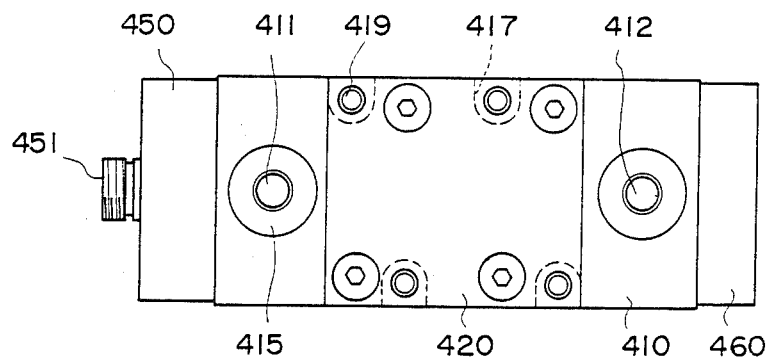
FIG. 4 is an underneath view of the device shown in FIG. 1.

Further, a rectangular portion 418 is cut away from the bottom of the main block 410 of the vacuum valve/sensor device 400 over a certain major portion thereof, between the lower high pressure air hole 411 and the lower vacuum hole 412. Within the bottom surface of this cutaway portion 418, along each of the long sides of the lower surface of the main block of the vacuum valve/sensor device 400, there are further formed a plurality, two in the shown preferred embodiment, of cutaway portions 417, as best seen in FIG. 5; the positions of these cutaway portions 417 correspond to the positions of the anchoring holes 314 formed in the upper surface of the main block 310 of the vacuum cancellation valve assembly 300. Into the rectangular shape of this cutaway portion 418 of the main block 410 there is snugly fitted a coupling plate 420, which is firmly attached to said main block 410 by a plurality of screws, the hexagonal heads of which are seen in FIG. 4 and are received in countersunk depressions formed in the lower surface of the filter coupling plate 420 so as not to protrude from said lower surface; but alternatively, in a variant embodiment, these heads of the screws could be allowed to protrude, and in such a case corresponding depressions would be required to be formed in the top surface of the vacuum cancellation valve assembly 300 main block 310. Through the coupling plate 420 there are formed four through holes 419, the position of each one thereof corresponding to the position of one of the anchoring holes 314 formed in the upper surface of the main block 310 of the vacuum cancellation valve assembly 300, and thus also corresponding to the position of one of the cutaway portions 417 of the main block of the vacuum valve/sensor device 400. Before the filter coupling plate 420 is secured as described above to the vacuum valve/sensor device 400 main block 410, through each of these holes 416 there is passed a screw 421 to point in the downwards direction (see FIG. 5), so that, after said plate 420 is secured to said main block 410 of the vacuum valve/sensor device 400, the heads of these screws 421 are relatively loosely received in the cutaway portions 417. When subsequently the vacuum valve/sensor device 400 is required to be fixed to the vacuum cancellation valve assembly 300, the operator positions said vacuum valve/sensor device 400 in place, then threads each of the screws 421 into its corresponding one of the threaded holes 314 in the upper surface of the vacuum cancellation valve assembly main block 310, and then tightens up each of said screws 421 by accessing its head, which is preferably an Allen type hexagonal head, with a hex or Allen wrench (not particularly shown) via the cutaway 417 in which said head is received. Accordingly, because the vacuum valve/sensor device 400 can thus be easily fitted to and removed from the vacuum cancellation valve assembly 300 by the use of these fixing screws 421, without any requirement for attaching or detaching any of the filter assembly 200 or the vacuum cancellation valve assembly 300 from the base assembly 100, or for attaching or detaching the vacuum generating apparatus 500 from said vacuum valve/sensor device 400, the assembly work for the vacuum generating and regulating apparatus as a whole is simplified, and the disassemblability and the servicability thereof are enhanced.

Through the main block 410 of the vacuum valve/sensor device 400 there is pierced, extending from the left side thereof in the figures to somewhat past its approximate mid portion, a sensor housing hole 422, to the side surface of which the upper and lower high pressure air holes 413 and 411 open. Into this sensor housing hole 422 there is snugly fitted a vacuum sensor 401, whose sensing portion is inserted into a hole formed at the bottom end of said hole 422. A set of lead wires for the sensor 401 extend from it to the outside of the vacuum valve/sensor device 400 main block 410, within the high pressure side cap 450, and are fixed to the inner side of a plug 451 fitted in said side cap 450. Around the intermediate portions of these lead wires 404 there is fitted a protective tube 424, the outer peripheries of the ends of which are sealed against the inside of the sensor housing hole 422 by gaskets 425. And thus the upper and lower high pressure air holes 413 and 411 are freely communicated together through the sensor housing hole 422, around this tube 424, while the air in them is prevented from undergoing any contamination or mixing with ordinary atmospheric air within the tube 424 and surrounding the sensor 401.

Figure 1:
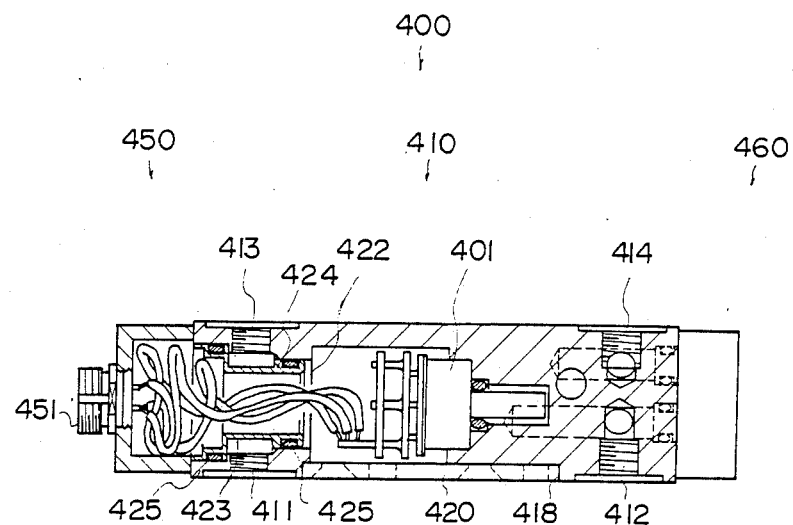
FIG. 1 is a vertical sectional view of the preferred embodiment of the vacuum valve/sensor device of the present invention, shown as separated from a vacuum generating and regulating apparatus of which it forms a part.
Figure 2:
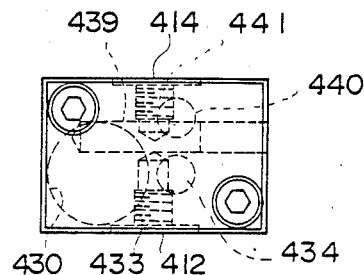
FIG. 2 is a side elevational view of the device shown in FIG. 1.
Figure 3:
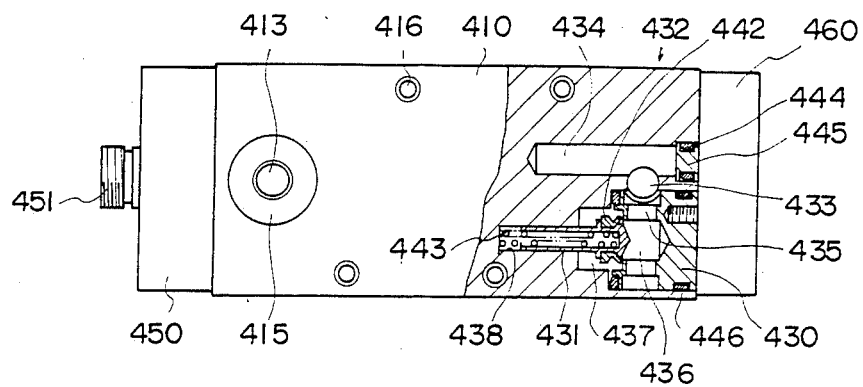
FIG. 3 is a top plan view of the device shown in FIG. 1.

The upper and lower vacuum holes 414 and 412 are connected together, with the interposition therebetween of a one way valve assembly as follows. From the lower vacuum hole 412 there extends in the vertical direction for a short distance to the mid level of the vacuum valve/sensor device 400 a hole 433, from the top end of which a hole 434 extends in the horizontal direction longitudinal to the main block 410 of said device 400 to reach the sensing element of the sensor 401, at which said hole 434 stops. Further, from said top end of said hole 433 another hole 435 extends in the horizontal direction transverse to said main block 410 to terminate in a chamber 436. Meanwhile, from the upper vacuum hole 414 there extends in the vertical direction for a short distance down to a point short of the mid level of the vacuum valve/sensor device 400 a hole 441, from the bottom end of which a hole 440 extends in the horizontal direction longitudinal to the main block 410 of said device 400. And from the leftmost end in FIG. 2 of said hole 440 another hole 439 extends in the horizontal direction transverse to said main block 410 to terminate by communicating to a chamber 437 adjacent to the chamber 436. Between the chambers 436 and 437 there opens a valve hole, and the opening and closing of this valve hole are controlled by an annular shaped sealing ring 442, which has a cross section shaped like an outwardly facing letter "V" and will hereinafter be referred to as a V-ring, and which is fitted on the tip portion of a valve element 431. This valve element 431 has a hollow body which slides in a guide hole 438 formed in the main block 410 of the device 400 coaxial with said valve hole. And a compression coil spring 443 fitted inside the hollow body of said valve element 431 biases said valve element 431 and the V-ring 442 mounted thereon in the rightwards direction as seen in FIG. 3, so as to urge said V-ring 442 in the direction to close the valve hole communicating chambers 437 and 436, said chamber 437 being communicated as explained above to the upper vacuum hole 414. Further, as suggested in the figures, all these various holes are actually formed in practice by being bored from the outside of the main block 410 of the device 400, and the outer ends of the relevant ones of said holes are plugged by stoppers 445 which are provided with sealing gaskets 444 in order to prevent air leakage. And the low pressure side cap 460 is fixed over these stoppers 445 and gaskets 444, so as to securely retain them.

This vacuum valve/sensor device 400 functions as follows. When the vacuum generating apparatus 500 is functioning as will hereinafter be described so as to suck air out from the upper vacuum hole 414, this lowers the air pressure in the chamber 437, via the holes 441, 440, and 439 in order as explained above, and, when this air pressure in the chamber 437 drops to be substantially lower than the air pressure in the chamber 436, then the differential pressures on the valve element 431 cause it to move leftwards in its guide hole 438 against the biasing action of the compression coil spring 443 which is overcome, and this carries the V-ring 442 to open the valve hole, accordingly communicating the chamber 436 to the chamber 437. Thus air is sucked out from the lower vacuum hole 412 through the holes 433 and 435, into the chamber 436 and thence through the valve hole and up to the vacuum generating apparatus 500, and accordingly any apparatus which is pneumatically connected to the lower vacuum hole 412 receives vacuum supply therefrom.

On the other hand, after a vacuum has been established in the lower vacuum hole 412 and in the device or devices connected thereto in the above explained manner, when subsequently the operation of the vacuum generating apparatus 500 is stopped so that it ceases to suck air out from the upper vacuum hole 414, or alternatively when the vacuum values at the upper and lower vacuum holes 412 and 414 become substantially equal to one another, then the air pressure in the chamber 437 comes to be at least equal to or possibly greater than the air pressure in the chamber 436, and this allows the compression coil spring 443 to move the valve element 431 in the rightwards direction in FIG. 3 in its guide hole 438, which carries the V-ring 442 to close the valve hole, accordingly cutting off the communication of the chamber 436 with the chamber 437. Thus air cannot be sucked out from the upper vacuum hole 414 and from the vacuum generating apparatus 500 downwards to the lower vacuum hole 412 and to the device or devices connected thereto, and accordingly a one way valve function is provided by this construction. Thus, vacuum once established in the lower vacuum hole 412 and in the device or devices connected thereto is well and reliably maintained, even when the vacuum generating apparatus 500 is not operated for some time.

Thus, because the vacuum condition once established is maintained by this action of the one way valve assembly 405, it is possible to reduce the operating costs of the device, by stopping the action of the vacuum generating apparatus 500 after the required vacuum level has been reached. Since the one way valve 431 is moved by the action of the spring 443 alone, thereby the maintenance of the vacuum condition is particularly economical. Also, because in this vacuum valve/sensor device 400 the pressure sensor 401 is situated on the side of the one way valve 431 remote from the vacuum generating apparatus 500, thereby, after stopping the action of the vacuum generating apparatus 500 according to information from this vacuum sensor 401 to which the hole 434 of the vacuum side reaches, to the effect that the required level of vacuum has been attained, subsequently the vacuum sensor 401 can still continuously measure the actual amount of vacuum which is present at the lower vacuum hole 412 and which is being supplied to the device or devices connected thereto, and can accordingly detect whether this vacuum value has dropped to a level which makes renewal of said vacuum desirable. Accordingly, at such a time, it is possible with the shown construction to restart the action of the vacuum generating apparatus 500 according to such information from this vacuum sensor 401, and thereby the supplied vacuum value can again be brought up to an appropriate level. To consider a concrete case, when a vacuum suction pad (not particularly shown in the drawings) is connected to an appropriate suction one on the vacuum or low pressure side of the conduits 107 of the base assembly 100 of this vacuum generating and regulating apparatus, and a work piece (also not shown) is being raised and/or transported by being picked up by this vacuum suction pad, then: a vacuum value appropriate to the work load, i.e. the weight of the work piece, is generated by the vacuum generating apparatus 500; the work piece is sucked up and adhered to the vacuum sucking pad; then the vacuum generating apparatus 500 may be stopped; and then the workpiece can be raised and transported while the vacuum value being supplied to the vacuum suction pad is maintained by the closing of the one way valve 431. And, during this transport, if a gradual diminution in the vacuum value being supplied to the vacuum suction pad occurs, then this is detected by the operation of the vacuum sensor 401, and when this vacuum level drops below a certain determinate level the vacuum generating apparatus 500 can be restarted, so as to raise said vacuum level to an appropriately high value.

The vacuum generating apparatus 500, which is a so called ejector type vacuum pump, will now be described with reference to FIGS. 17 through 20. This vacuum generating apparatus 500 comprises a main block 510 which is again formed in the shape of an oblong thick plate or flattened rectangular parallelopiped, of approximately the same width as the main block of the vacuum valve/sensor device 400 so as to conform thereto but substantially shorter than it, and further said vacuum generating apparatus 500 comprises a high pressure side cap 560, secured on the left side of its main block 510 as seen in the drawing, an end cap 580 mounted to said high pressure side cap 560, and a silencer 590 secured on the right side of its said main block 510 as seen in the drawing for muting the noise produced by high pressure air which is being expelled in order to create vacuum as will be explained shortly. In the bottom surface of the main block 510 (seen in FIG. 20) there is formed as a sleeved hole a lower vacuum hole 511, and in the bottom surface of the high pressure side cap 560 there is formed as a similar sleeved hole a lower high pressure air hole 561; these lower holes 561 and 511 are as before located on the approximate center line in its longitudinal or longer direction of the rectangular bottom surface of the vacuum generating apparatus 500, on either side of the mid point thereof, in positions to correspond to the upper high pressure air hole 413 and the upper vacuum hole 414 respectively of the main block 410 of the vacuum valve/sensor device 400, when the vacuum generating apparatus 500 is clamped together with said vacuum valve/sensor device 400 as shown in FIG. 5. At the outer ends of this lower high pressure air hole 561 and this lower vacuum hole 511, where they open to said lower surfaces of the side cap 560 and of the main block 510 respectively, there are formed stepped shapes 564 and 514 for receiving pressure sealing gaskets, not shown; these gaskets may again for example be steel washers or the like which, when deformed by the clamping pressure between the vacuum generating apparatus 500 and the vacuum valve/sensor device 400 mounted to the lower surface thereof, become somewhat squashed so as to provide hermetic seals. Further, in the top surface of this vacuum generating assembly main block 510, as shown in FIG. 17, there is formed as a sleeved hole an upper vacuum hole 512, and in the top surface of the high pressure side cap 560 there is formed as a similar sleeved hole an upper high pressure air hole 562; again, these upper holes 562 and 512 are located on the approximate center line in its longitudinal or longer direction of the rectangular top surface of the vacuum generating apparatus 500, on either side of the mid point thereof. At the outer ends of this upper high pressure air hole 562 and this upper vacuum hole 512 where they open to said upper surfaces of the vacuum cancellation valve assembly main block 510 and of the side cap 560 respectively, there are formed similar stepped shapes 513 and 563 for receiving pressure sealing gaskets 564 for providing pressure seals against the vacuum valve/sensor device 400, being held thereto by blocking off bolts 501 which are screwed into said upper holes 562 and 512, as shown in FIG. 17. And also in the top surface of this vacuum generating apparatus main block 510 there are formed a plurality, four in the shown preferred embodiment, of anchoring holes 515, not used in the present construction for any particular purpose, but convenient if the various units described herein and shown in FIG. 5 are required to be stacked in an alternative arrangement to that shown in FIG. 5, in an alternative application, or if the vacuum generating apparatus 500 is required to be attached, either by itself or with one or more of the other shown devices in combination with it, underneath a machine to which it is to be provided. According to this concept, in fact the relative positions of the four holes of each of the five sets of holes 104, 314, 416, 515, and the mounting holes not particularly shown provided on top of the filter assembly 200, are substantially identical.

Further, a rectangular portion 517 is cut away from the bottom of the main block 510 of the vacuum generating apparatus 500 over a certain major portion thereof, from its left side to the lower vacuum hole 511. Within the bottom surface of this cutaway portion 517, along each of the long sides of the lower surface of the main block of the vacuum generating apparatus 500, there are further formed a plurality, two in the shown preferred embodiment, of cutaway portions 516, as best seen in FIG. 5; the positions of these cutaway portions 516 correspond to the positions of the abovementioned anchoring holes 416 formed in the upper surface of the main block 410 of the vacuum valve/sensor device 400. Into the rectangular shape of this cutaway portion 517 of the main block 510 there is snugly fitted a vacuum generating apparatus coupling plate 519, which is firmly attached to said main block 510 by a plurality of screws, the haxogonal heads of which are seen FIG. 20 and are received in countersunk depressions formed in the lower surface of the coupling plate 519 so as not to protrude from said lower surface; again, alternatively, in a variant embodiment, these heads of the screws could be allowed to protrude, and in such a case corresponding depressions would be required to be formed in the top surface of the vacuum valve/sensor device 400 main block 410. Through the coupling plate 519 there are formed four through holes 518, the position of each one thereof corresponding to the position of one of the abovementioned anchoring holes formed in the upper surface of the main block 410 of the vacuum valve/sensor device 400, and thus also corresponding to the position of one of the cutaway portions 516 of the main block of this vacuum generating apparatus 500. Before the coupling plate 519 is secured as described above to the vacuum generating apparatus 500 main block 510 by the screws 595, through each of these holes 518 there is passed a screw 520 to point in the downwards direction (see FIG. 5), so that, after said coupling plate 519 is secured to said main block 510 of the vacuum generating apparatus 500, the heads of these screws 520 are relatively loosely received in the cutaway portions 516. When subsequently the vacuum generating apparatus 500 is required to be fixed to the vacuum valve/sensor device 400, the operator positions said vacuum generating apparatus 500 in place, then threads each of the screws 520 into its corresponding one of the threaded holes 416 in the upper surface of the vacuum valve/sensor device main block 410, and then tightens up each of said screws 520 by accessing its head, which again is preferably an Allen type hexagonal head, with a hex or Allen wrench (not particularly shown) via the cutaway 516 in which said head is received. Accordingly, because the vacuum generating apparatus 500 can thus be easily fitted to and removed from the vacuum valve/sensor device 400 by the use of these fixing screws 520, without any requirement for attaching or detaching any of the filter assembly 200, the vacuum cancellation valve assembly 300, or the vacuum valve/sensor device 400 from the base assembly 100 or from one another, the assembly work for the vacuum generating and regulating apparatus as a whole is simplified, and the disassemblability and the servicability thereof are enhanced.

Through the main block 510 of the vacuum generating apparatus 500 there is pierced, extending from the left side thereof in the figures to just before the upper and lower vacuum holes 512 and 511, a solenoid housing hole 521, and, as best seen in FIG. 19, an aperture 522 is formed in the left side of said main block for receiving parts which will be detailed shortly. And from its right side, through said main block 510 in the drawing, there is pierced a vacuum creation hole 523, of somewhat smaller size than said solenoid housing hole 521, which extends past the upper and lower vacuum holes 512 and 511 to meet the end of said solenoid housing hole 521, thus to define a step flange 540 which extends somewhat in the inward direction at their meeting point. The outer end of this vacuum creation hole 523 joins to a silencer insertion hole 524 which is formed with a female thread for fixing the silencer 590 thereto, and a flange 525 is defined between said silencer insertion hole 524 and the vacuum creation hole 523. Into the solenoid housing hole 521 there is fitted a solenoid 527 which is wound on a bobbin 526, with a mounting member 531, formed as a hollow tube, inserted between the outer surface of the solenoid 527 and the inner surface of said solenoid housing hole 521 to promote tight and snug fitting between these members. Into the left end of the bobbin 526 as seen in the figure, i.e. into its high pressure end, there is inserted a support member 530 formed with an axial hole, said support member 530 being held in place by the pressure of the fixing of the high pressure side cap 560 and thereby axially holding the bobbin 526, the solenoid 527, and the mounting member 531 in place within the solenoid housing hole 521 by pressing them against the aforementioned step flange 540. And sealing gaskets are provided for making air tight seals between the mounting member 531 and said step flange 540, and between said mounting member 531 and the support member 530; also, a sealing gasket 573 is provided for making an air tight seal between the support member 530 and the high pressure side cap 560, when said cap 560 is fitted to the main block 510 as will be explained shortly. The support member 530 slidably supports a movable tube member 529 in its said axial hole, said tube member 529 extending through the axial hole of the bobbin 526 and through the solenoid 527 to project, in the leftward direction, into a chamber 565 defined within the high pressure side cap 560; and on the right end in the figure of the tube member 529 there is mounted a metallic solenoid core 528, with a slight clearance being left between said solenoid core 528 and the interior surface of the bobbin 526. On the left end in the figure of the tube member 529 there is fitted a spring receiving member 532, and a compression coil spring is fitted between said spring receiving member 532 and the inner side of the high pressure side cap 560, so as to bias the tube member 529 and the solenoid core 528 mounted thereon in the rightwards direction in the figure. A side hole 533 is formed in the wall of the left hand end portion of the tube member 529, so as to communicate the space within it to the chamber 565.

Referring now to the high pressure side arrangements, both the upper high pressure air hole 562 and the lower high pressure air hole 561 communicate to said chamber 565, thus being communicated freely to one another, and so that, further, high pressure air is substantially freely supplied via the hole 533 to the interior of the tube member 529. Within the aperture 522 formed as mentioned above in the left side of the main block 510 there is housed a molded portion 542 to which a terminal pin 541 is secured. This terminal pin 541 serves as one terminal of the solenoid 527, being connected to one side of the coil thereof (the other side of said coil is connected to earth), and projects out from the main block 510 in the longitudinal direction of the apparatus, leftwards in the figure, so as to be closely fitted into a socket 567 fitted in the high pressure side cap 560 to make electrical connection therewith. Thereby, the cap 560 may be easily mounted and demounted to the main block 510 of the vacuum generating apparatus 500, being positionally located by a locating pin 553 fitted to the main block 510 which fits into a hole 553 formed in the cap 560, without any problems arising regarding the establishment of electrical connections to the solenoid 527 thereof. In a recess formed on the outer side of the high pressure side cap 560, there is housed an internal electrical circuit of a per se known type for controlling the flow of current to the solenoid 527 via the socket 567 and earth, comprising a varistor 568, a resistor 569, a diode 570, and a monitor lamp 571 for providing a visible indication of operation. And the outer end cap 580 is secured over this cavity for the purpose of protecting this electrical circuit therein, said cap 580 being provided with an aperture 581 for allowing the monitor lamp 571 to be observed and a socket 582 for making electrical connection from the outside to said electrical circuit.

Referring now to the low pressure side arrangements, the silencer 590, which is screwingly secured in the female thread of the silencer insertion hole 524, is configured as a primary silencer body 592 which has a receiving hole 591 for receiving a diffuser 544 which will be described shortly, and a cap 593 is secured at the outer end of this silencer body 592. High pressure air which has served its function of generating vacuum as will be explained shortly is vented with a silencing action being provided thereto to the outside atmosphere via the space between the edge of the silencer cap 593 and the primary silencer body 592, as well as from the space in the silencer cap 593. And in the vacuum creation hole 523 there are secured a diffuser 544 and a valve seat member 543, which are axially clamped between the leftmost end of the silencer 590 and the end of the mounting member 531, and which are sealed thereagainst by gaskets. The valve seat member 543 is formed with a valve hole 546 (see FIG. 14) through its axial central portion, which opens out in a thinly tapered cone nozzle shape 545. Thus, the only communication between the solenoid housing hole 521 and the low pressure side of the device is through this valve hole 546. This nozzle shape 545 of the valve seat member 543 opens to a venturi hole 548 of the diffuser 544 with a small gap therebetween, the mouth of said venturi hole 548 being substantially larger than the mouth of the nozzle shape 545. This venturi hole 548 leads to an opening 591 of the silenser 593 which vents the high pressure air. Around the aforesaid small gap between said nozzle hole of the valve seat member 543 and said venturi hole 548 of the diffuser 544 there is defined a diffusion chamber 547, to which via apertures 549 and 550 the lower and upper vacuum holes 511 and 513 respectively are communicated.

Next, again referring to FIGS. 14 through 16 since the configuration of these parts in this vacuum generating apparatus 500 is substantially identical to the configuration in the previously described vacuum cancellation valve assembly 300, the nozzle structures at the end of the solenoid core 528, including the valve seat member 543, will be explained; these figures show the same parts in three different actuation states. The right end portion in the figures of the solenoid core 528 is first tapered down at a portion 534 at which the interior space within the tube member 529 is vented, and thence is formed with an extension at the end of which there is formed an enlarged portion 535 which is fitted and held inside a cavity defined within a valve element 536. This valve element 536 is formed with a hollow cylindrical body portion 554, a flange 537 which extends somewhat radially inward from the left end in the figures of said body portion 554, and a tip portion 539 with a central hole 538 formed through it: this tip portion 539 has a conically shaped outer surface which cooperates with a conical surface formed on the left side in the figure of the valve seat member 543 around the valve hole 546 therein. The valve element 536 is loosely fitted over this enlarged portion 535 at the tip end of the solenoid core 528, since its internal space is somewhat larger both in the longitudinal and the transverse directions than said enlarged tip end portion 535, and further this flange 537 prevents said valve element 536 from coming off from said solenoid core 528.

FIG. 14 shows these parts in their positions in which no electrical energy is being supplied to the solenoid 527, and accordingly by the biasing effect of the compression coil spring 556 the solenoid core 528 and the tube member 529 are pushed to their rightmost positions as seen in the figures. In this state, the enlarged portion 535 of the solenoid core 528 closes the leftmost end of the central hole 535 of the tip portion 539 of the valve element 536; and further the conical surface of this tip portion 539 is pressed against the conical surface of the valve seat member 543. Accordingly, although plentiful high pressure air is transmitted to the volume around the valve element 536 through the interior space of the tube member 529 from the chamber 565, this air is completely prevented from passing into the aperture 546 of the valve seat member 543, and accordingly no air blows out from the nozzle shape 545 of the valve seat member 543 across the gap into the venturi hole 548 of the diffuser 544. Thus, no particular vacuum is generated, and thereby the lower vacuum hole 511 is supplied with air at substantially atmospheric pressure, via the venturi hole 548 of the diffuser 544 and via the silencer 590. This is the quiescent non operational state of the apparatus.

FIG. 15 shows the parts in their positions shortly after activation of the solenoid 527 before the pressure has yet equalized, and in this state the biasing effect of the compression coil spring 566 is somewhat overcome by the attraction of said solenoid 527, so that the solenoid core 528 and the tube member 529 are somewhat pulled to the left from their FIG. 14 positions. In this state, the enlarged portion 535 of the solenoid core 528 is pulled leftwards in the cavity in the valve element 536, and thereby opens the hole 538 in the tip portion 539 thereof; but said valve element 536 is not yet displaced leftwards, being held in place by air pressure on its right side, so that the conical surface of its tip portion 539 continues to be pressed against the conical surface of the valve seat member 543. Accordingly, the high pressure air is allowed to pass to a certain extent into the aperture 546 of the valve seat member 543 through small gaps between the enlarged solenoid core portion 535 and the valve element 536, and accordingly this moderate flow of high pressure air blows out from the nozzle shape 546 of the valve seat member 543 across the gap into the venturi hole 548 of the diffuser 544. Thus, a moderate vacuum is generated, and thereby the lower vacuum hole 511 is supplied with a moderate vacuum value. This state of the apparatus allows progressive and steady increase of the vacuum supplied to the apparatus to which this apparatus is connected. Further, the displacement of the valve element 536 to the leftwards from the valve seat member 543 may be made easy by the back pressure of the air in the nozzle hole 546.

FIG. 16 shows the parts in their positions when the solenoid 527 has been activated for some time. In this state, the biasing effect of the compression coil spring 556 is now completely overcome by the attraction of the solenoid 527, so that the solenoid core 528 and the tube member 529 are pulled to their fully leftmost positions. In this state, the enlarged portion 535 of the solenoid core 528 further pulls leftwards on the flange 537 of the valve element 536, and thereby displaces said valve element 536 leftwards against the action of the possible residual air pressure on its left side, so that now the conical surface of its tip portion 539 is withdrawn from the conical surface of the valve seat member 543. Accordingly, the high pressure air is allowed to flow in great volume into the aperture 546 of the valve seat member 543, and accordingly this high flow of high pressure air blows out from the the nozzle hole 546 of the valve seat member 543 across the gap into the venturi hole 548 of the diffuser 544. Thus, a relatively high vacuum value is generated by the per se known Bernouilli effect, and thereby the lower vacuum hole 511 is supplied with a high vacuum value. This state of the apparatus allows the vacuum supplied to the apparatus to which this apparatus is connected, i.e. supplied out through the lower vacuum hole 511 to the filter assembly 200 and the base assembly 100 and out through the vacuum sucking conduits 108 connected to the vacuum suction hole 102 to a device such as a sucking cup that makes use of vacuum, to be maximized.

As compared to a possible alternative but less sophisticated construction in which the valve element 536 would be directly pulled by the solenoid 527, i.e. typically would be integrally formed with the solenoid core 528, this construction as shown above allows the movement of this valve element 536 with almost no resistance, and hence the burden imposed on the solenoid 527 is relatively low. Accordingly, the size of the solenoid 527 may be reduced, and this means that the device can use less energy.

Also, when the vacuum generating apparatus 500 as shown above is caused to generate vacuum by the activation of the solenoid 527, since the movable metal core 528 of this solenoid 527 is secured to the movable pipe member 529 through which the entire air flow utilized for this vacuum production flows, this means that the solenoid 527 is cooled by the air flow, and even if the solenoid 527 is operated at high power there is no reduction in its efficiency due to heating up thereof. Furthermore, the solenoid 527 also is cooled by conduction of heat through the mounting member 531 to the main block 510, and accordingly the entire vacuum generating apparatus 500 is utilized as a radiator means. This makes the prevention of loss of effectiveness of the device due to heating up thereof all the more assured.

In the shown vacuum generating and regulating apparatus, there is utilized the described assemblage of the base assembly 100, the filter assembly 200, the vacuum cancellation valve assembly 300, the vacuum valve/sensor device 400, and the vacuum generating apparatus 500, but, depending upon the particular application, one or more of these elements may be omitted, since only the vacuum generating apparatus is absolutely necessary from the point of view of generating vacuum. For example, the base assembly 100 may be dispensed with, and in such a case connection for supply of high pressure air and take out of vacuum may be made directly to lower high pressure air hole 211 and the lower vacuum hole 212 respectively of the filter assembly 200. Also, if the air used for the negative pressure side is particularly clean, the filter assembly 200 may be dispensed with. In some cases, the use of the vacuum cancellation valve assembly 300 may also be waived, if no such function is required for the system. And if there is no requirement for measurement of the level of the vacuum provided, the vacuum valve/sensor device 400 according to the present invention may be omitted. Also the order of the stacking of each assembly and device may be changed. For example, filter assembly 200 may be incorporated between the vacuum cancellation valve assembly 300 and the vacuum valve/sensor device 400, to prevent reflux of the dust on the filter 202 to the vacuum suction pad, when the vacuum cancellation valve assembly is activated.

Thus, according to the shown preferred embodiment of the present invention, there is provided a vacuum valve-sensor device which comprises a one way valve which allows gas to flow towards the vacuum generating apparatus but not away therefrom, and a pressure sensor on the side of said one way valve remote from said vacuum generating apparatus. Accordingly, not only is the maintenance of the vacuum condition by the one way valve made available, but if for any of a number of reasons a drop in the vacuum level occurs between the one way valve and the apparatus that is being supplied with said vacuum, since this drop in the pressure level can be detected by the pressure sensor, the operation of the pressure generating apparatus can be restarted without any substantial delay. Further, in the shown preferred embodiment of the present invention, because the one way valve is formed so that by the action of a spring a valve seat is closed from the side of the vacuum generating apparatus, this means that the vacuum condition can be maintained only by the action of such a spring, and accordingly the apparatus is cheap to manufacture and reliable.

Although the present invention has been shown and described with reference to the preferred embodiment thereof, and in terms of the illustrative drawings, it should not be considered as being limited thereby, since many alterations could be made in the perhaps purely fortuitous details of the embodiment and the drawings, but as being defined solely by the scope of the appended claims, which follow.

What is claimed is:

1. A vacuum valve-sensor device for mounting on a vacuum-generating source comprising, a rectangular block body having an inner cavity, a pressure sensor in said cavity, the block body having two adjacent chambers and a valve seat defined between the chambers and having a valve seat opening for communicating the two chambers, the block body having slidable therein a one-way valve for establishing and disestablishing communication between the two chambers, said one-way valve having a valve element in one of said chambers continuously biased in a direction for seating on said valve seat and closing the valve seat opening when pressure in said two chambers is substantially equal and when a pressure differential in said chambers is such the pressure in said one chamber is greater than the pressure in the other of said two chambers, means continuously biasing the valve element to a seated position, said block body having a first vacuum opening open to a surface thereof and to which a vacuum is applied from said vacuum source, the body block having passageways communicating the first vacuum opening and said cavity and said first chamber, the block body having a second vacuum opening to a surface thereof for applying therethrough a vacuum established through said two chambers, said first and second vacuum openings being disposed on opposite sides of said block body, the block body having a passageway providing communication between said second vacuum opening and the other of said two chambers, whereby when a vacuum is applied at said first vacuum opening the one-way valve element is unseated and said valve is opened and a vacuum is applied at said second vacuum opening and when pressure difference between the chambers is substantially equal the one-way valve is seated and a vacuum applied through said second vacuum opening is maintained.

2. A vacuum valve-sensor device for mounting on a vacuum-generating source according to claim 1, is dimensionally configured to correspond in rectangular major surface area similarly with a major surface area of said vacuum source.

3. A vacuum valve-sensor device for mounting on a vacuum-generating source according to claim 2, in which said passageways extend to exterior surfaces of said block body, and means sealing the passageways from communication with said exterior surfaces of the block body.

4. A vacuum valve-sensor device for mounting on a vacuum-generating source comprising, a block body having an inner cavity, a pressure sensor in said cavity, said pressure sensor having electrical leads extending out of said cavity to the exterior of the block body the block body having two adjacent chambers and a valve seat defined between the chambers and having a valve seat opening for communicating the two chambers, the block body having therein a one-way valve for establishing and disestablishing communication between the two chambers, said one-way valve having a valve element in one of said chambers continuously biased in a direction for seating on said valve seat and closing the valve seat opening when pressure in said two chambers is substantially equal and when a pressure differential in said chambers is such that the pressure in said one chamber is greater than the pressure in the other of said two chambers, means continuously biasing the valve element to a seated position, said block body having a first vacuum opening open to a surface thereof and to which a vacuum is applied from said vacuum source, the body block having passageways communicating the first vacuum opening and said cavity and said first chamber, the block body having a second vacuum opening open to a surface thereof for applying therethrough a vacuum established through said two chambers, the block body having a passageway providing communication between said second vacuum opening and the other of said two chambers, whereby when a vacuum is applied at said first vacuum opening the one-way valve element is unseated and said valve is opened and a vacuum is applied at said second vacuum opening and when pressure difference between the chambers is substantially equal the one-way valve is seated and a vacuum applied through said second vacuum opening is maintained.

* * * * *